United States Patent
Chiba et al.

(10) Patent No.: US 12,420,203 B2
(45) Date of Patent: Sep. 23, 2025

(54) GAME SYSTEM, STORAGE MEDIUM USED IN SUCH, AND CONTROL METHOD

(71) Applicant: KONAMI DIGITAL ENTERTAINMENT CO., LTD., Tokyo (JP)

(72) Inventors: Shigeru Chiba, Tokyo (JP); Junki Hirai, Tokyo (JP); Kai Inoue, Tokyo (JP); Akira Sakai, Tokyo (JP); Tsuguo Shinpo, Tokyo (JP); Toshiaki Kanahara, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 425 days.

(21) Appl. No.: 17/989,867

(22) Filed: Nov. 18, 2022

(65) Prior Publication Data

US 2023/0078671 A1    Mar. 16, 2023

Related U.S. Application Data

(63) Continuation of application No. PCT/JP2021/017383, filed on May 6, 2021.

(30) Foreign Application Priority Data

May 22, 2020    (JP) .................................. 2020-090102

(51) Int. Cl.
*A63F 13/812*    (2014.01)
*A63F 13/537*    (2014.01)

(52) U.S. Cl.
CPC .......... *A63F 13/812* (2014.09); *A63F 13/537* (2014.09)

(58) Field of Classification Search
CPC .............................. A63F 13/812; A63F 13/537
See application file for complete search history.

(56) References Cited

U.S. PATENT DOCUMENTS

| 11,880,953 B2* | 1/2024 | Jayaram ................. G06Q 50/01 |
| 2013/0130791 A1* | 5/2013 | Myogan .................. A63F 13/42 |
| | | 463/30 |

(Continued)

FOREIGN PATENT DOCUMENTS

| JP | 2014-166565 A | 9/2014 |
| JP | 2015-077299 A | 4/2015 |

(Continued)

OTHER PUBLICATIONS

Office Action issued Aug. 9, 2024 in Korean Application No. 10-2022-7035785.

(Continued)

*Primary Examiner* — Reginald A Renwick
(74) *Attorney, Agent, or Firm* — Sughrue Mion, PLLC

(57) ABSTRACT

A game system is provided that can gamify selection at a selection opportunity. A game system provides, to a viewer who via a user terminal device is viewing a game screen of a baseball game provided by a game machine, a selection screen for selecting one or more of plural individual option regions that are included in the game screen of the baseball game. Furthermore, when a home run occurs in the baseball game according to a predetermined rule so as to enter (reach) any one of the plural individual option regions, the game system determines a winning region which a ball image of the home run enters and, if the winning region matches the individual option region selected in the selection screen, imparts a benefit to the viewer who made the selection.

12 Claims, 13 Drawing Sheets

(56) References Cited

U.S. PATENT DOCUMENTS

2019/0262700 A1* 8/2019 Nakamura ............ G06F 3/0488
2022/0295139 A1* 9/2022 Jayaram .................... G06T 7/33

FOREIGN PATENT DOCUMENTS

| JP | 2019-080816 A | 5/2019 |
| JP | 6665273 B1 | 3/2020 |
| TW | 201501757 A | 1/2015 |

OTHER PUBLICATIONS

International Search Report dated Jul. 20, 2021 from the International Searching Authority in International Application No. PCT/JP2021/017383.
Written Opinion dated Jul. 20, 2021 from the International Searching Authority in International Application No. PCT/JP2021/017383.
Office Action dated Feb. 29, 2024 in Japanese Application No. 2020-090102.

* cited by examiner

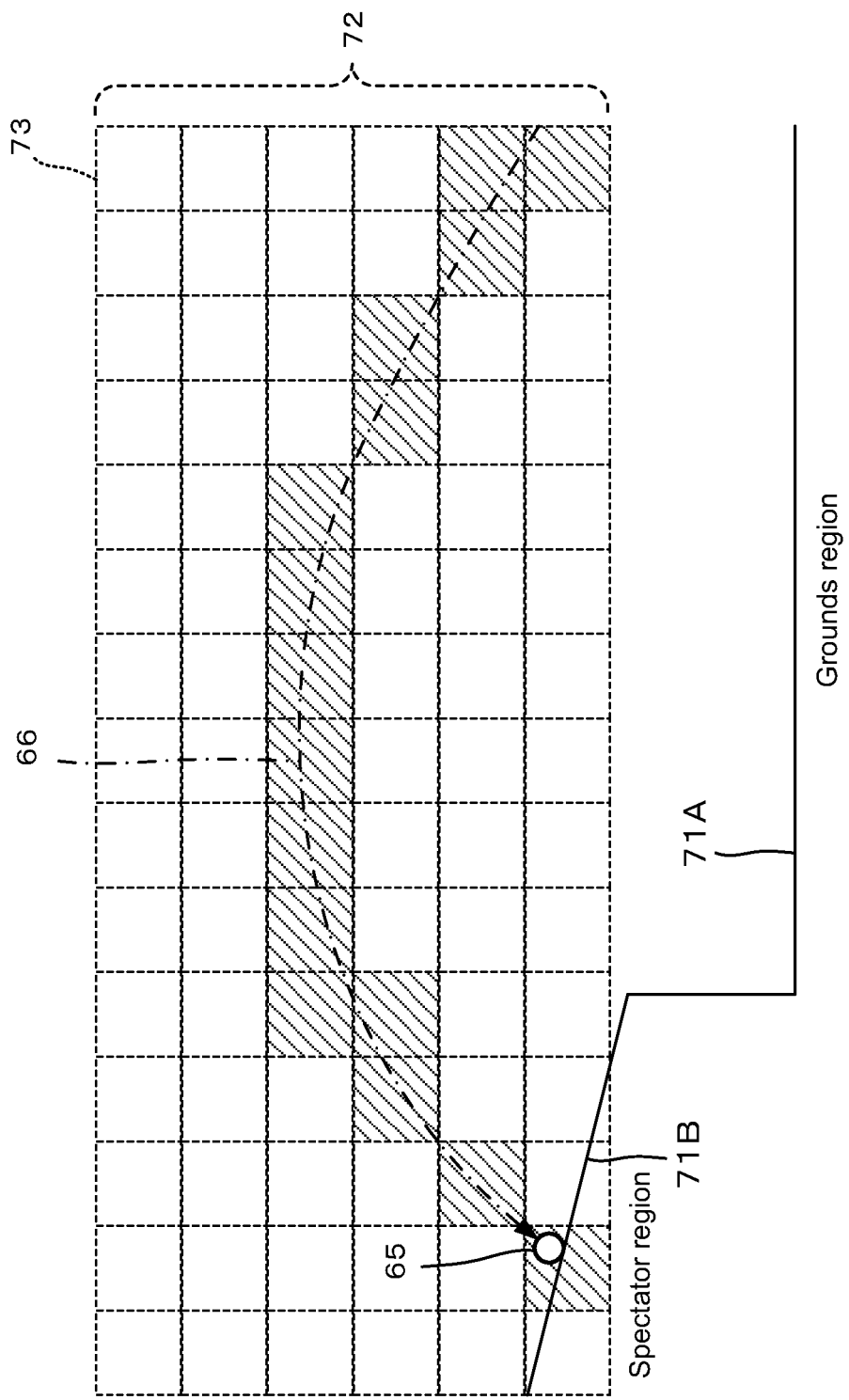

GAME SYSTEM, STORAGE MEDIUM USED IN SUCH, AND CONTROL METHOD

CROSS REFERENCE TO RELATED APPLICATION(S)

This application is a continuation of PCT/JP2021/017383 filed on May 6, 2021 and claims priority to Japanese Patent Application No. 2020-090102, filed with the Japanese Patent Office on May 22, 2020, the contents of each of which are incorporated by reference herein in their entireties.

FIELD OF ART

The present invention relates to a game system and so on that provides to a user a selection opportunity for selecting at least one among a plurality of options respectively corresponding to a plurality of regions included in a game screen, displayed on a display device, of a game played through the game screen.

BACKGROUND ART

Game systems exist that provide to a user a selection opportunity for selecting at least one among a plurality of options respectively corresponding to a plurality of regions included in a game screen, displayed on a display device, of a game played through the game screen. For example, a game system is known that imparts to a spectating player spectating a racing game, an opportunity to select a spectating perspective from among a plurality of perspectives set in a racing course of the game (see for example patent literature 1). Patent literature 2 is another example of prior-art literature related to the present invention.

PRIOR-ART LITERATURE

Patent Literature

Patent literature 1: JP2015-77299A
Patent literature 2: JP6665273B

SUMMARY OF INVENTION

Technical Problem

In the game of patent literature 1, there is a potential for some event to occur that is associated with perspective—for example, a car crashing in a spectating perspective. However, a configuration is such that even if such an event were to occur, no privilege associated with the occurrence of the event would be imparted, to a spectating player who selected the perspective wherein the event occurred, based on a condition of the event occurring. Likewise, in the system of patent literature 2 as well, it seems that content including a character is viewed from a viewing position that is according to a viewing user. In the system of patent literature 2 as well, there is a potential for the character to perform some event in the viewing position. However, once again, a configuration is such that even if such an event were to occur, no privilege associated with the occurrence of the event would be imparted, to the viewing user in the viewing position wherein the event occurred, based on a condition of the event occurring (in fact, based on the guarantee of fairness that is taught in, for example, paragraphs 0057 to 0059, it could be said that imparting such a privilege would be the opposite configuration). As a result, in these systems, game or content circumstances give no major merit (benefit) to the spectating player or the like. As such, there is room for improving benefits of a spectator (or viewer) of a game or the like through such benefits and for improving an interestingness of spectating or the like.

Therefore, an object of the present invention is to provide a game system and so on that can gamify selection at a selection opportunity.

Solution to Problem

A game system according to the present invention is a game system comprising a computer that provides to a user a selection opportunity for selecting at least one among a plurality of options respectively corresponding to a plurality of regions included in a game screen, displayed on a display device, of a game played through the game screen, wherein the computer serves as: a region determination device that, when an event occurs according to a predetermined rule so as to be associated with a portion of the plurality of regions in the game, determines the portion of the regions associated with the event; and a privilege imparting device that imparts a privilege to the user when the portion of the regions is included in a corresponding region serving as a region corresponding to the at least one option selected at the selection opportunity.

On the other hand, a non-transitory computer readable storage medium of the present invention is a non-transitory computer readable storage medium storing a computer program configured to cause a computer connected to the display device to function as each device of the game system described above.

Furthermore, a control method according to the present invention is a control method of controlling a computer which is incorporated in a game system that provides to a user a selection opportunity for selecting at least one among a plurality of options respectively corresponding to a plurality of regions included in a game screen, displayed on a display device, of a game played through the game screen, wherein the control method of controlling the computer comprises: a region determination step that, when an event occurs according to a predetermined rule so as to be associated with a portion of the plurality of regions in the game, determines the portion of the regions associated with the event; and a privilege imparting step that imparts a privilege to the user when the portion of the regions is included in a corresponding region serving as a region corresponding to the at least one option selected at the selection opportunity.

BRIEF DESCRIPTION OF DRAWINGS

FIG. 13 is an explanatory diagram for describing a selection screen of a variation.

DESCRIPTION OF EMBODIMENTS

One example of a game system of one embodiment of the present invention is described below. First, an overall configuration of the game system of one embodiment of the present invention is described with reference to FIG. 1. A game system 1 includes a center server 2, as an example of a server device, and a game machine 3 that is connected to the center server 2 via a predetermined network NT. The center server 2 is configured as one logical server device by server units 2A, 2B, . . . , as an example of a plurality of computer devices, being combined. However, the center server 2 may be constituted by a single server unit. Alternatively, the center server 2 may be logically configured by using cloud computing.

The network NT may be configured as appropriate as long as the game machine 3 (or, for example, a user terminal device 4 that is described below) can be connected to the center server 2. As one example, the network NT is constructed by the internet, as an example of a WAN, and LANs that respectively connect the center server 2 and the game machine 3 to the internet. Incidentally, various computer devices may be interposed as appropriate between the game machine 3 and the LAN. In this situation, such a computer device and the game machine 3 may be constructed as one local system, and such a local system may be connected to the center server 2 via the network NT.

Figure 1:
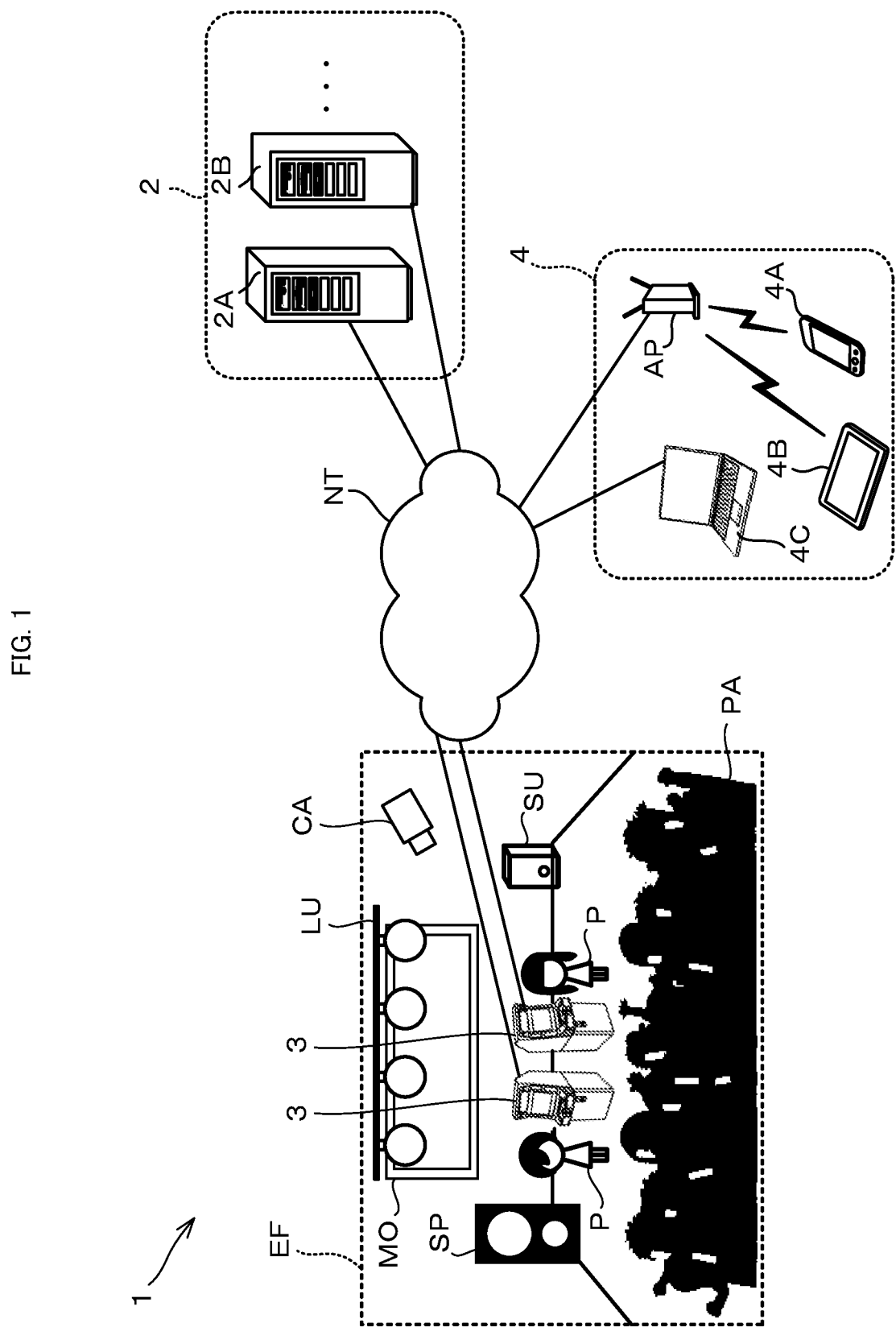
FIG. 1 is a diagram illustrating a schematic configuration of a game system of one embodiment of the present invention.

The game machine 3 is a device that provides a game. As the game machine 3, various computer devices for individual use such as a stationary or mobile game machine (including a tablet or a smartphone) or a desktop or laptop personal computer may be used. In the example of FIG. 1, an arcade game machine is used. The arcade game machine is a computer device that is installed in various facilities such as a store and has as its main object to bring in revenue by having a large number of users play a game repeatedly. As such, the game machine 3 is configured as a commercial-use (business-use) game machine (game machine that provides a game for a fee) that, in exchange for payment of a predetermined play charge, has the user play the game within a scope corresponding to the play charge.

The game machine 3 may be installed as appropriate in various facilities. In the example of FIG. 1, it is installed in an event hall (facility) EF. Various events may be held in the event hall EF, and the game machine 3 may be utilized as appropriate in the events. In the example of FIG. 1, a game event using the game provided by the game machine 3 is being held in the event hall EF. In this situation, the game machine 3 may provide the game in exchange for the predetermined play charge as is the case when the game machine 3 is installed in a store or the like. However, in the example of FIG. 1, game play is provided for free.

The game machine 3 may provide an appropriate game such as an action game, a simulation game, a role-playing game, a timing game (musical game), or a sports game for the game event. The game machine 3 may provide these games for single-player (individual) play or multiplayer play. Moreover, in multiplayer play, the game may be provided as a versus or co-op (including versus or co-op with a computer) game of an appropriate format such as one versus one, one versus many (a team), or many versus many (a number of players may be discretionary and may match but does not need to match). As such, an appropriate number of game machines 3 may be installed in the event hall EF according to such various games. In the example of FIG. 1, no fewer than two game machines 3 are installed in the event hall EF. Moreover, the two game machines 3 each provide a versus game wherein two users P (also referred to as "players P" hereinbelow) who each play the game via the two game machines 3 play each other one versus one.

The game event may be configured as a competitive meet of an appropriate format such as a tournament or league matches or may simply be configured as an exhibition meet. Moreover, the game event may be an event with or without spectators. In this manner, the game event may be configured as appropriate according to game type and the like. In the example of FIG. 1, the game event is configured as an event with spectators, wherein spectators PA are present watching the playing of the two players P playing each other via the two game machines 3 on a stage.

The event hall EF is a hall wherein the game event is held. As the hall of the game event, an appropriate number of event halls EF may be prepared; only one event hall EF may be prepared, or a plurality of event halls EF (including a situation wherein one event hall EF functions as a plurality of event halls EF at different times) may be prepared. Moreover, the plurality of event halls EF may provide one game event (including a situation wherein each event hall EF holds the event at the same time and a situation wherein each event hall EF holds the event at different times) or provide a plurality of game events. Hereinbelow, a game system 1 applied as a game event in one event hall EF is described as one example.

In the event hall EF, in addition to the game machines 3, various devices such as effects devices for adding effects to (enlivening) the game event may be installed as appropriate. In the example of FIG. 1, a light unit LU, a speaker SP, a smoke machine SU, a monitor MO, and a camera CA are installed, each being one type of effects device (although the example of FIG. 1 illustrates one each of the devices, the devices are not limited to being one each, and an appropriate number may be installed).

The light unit LU is a well-known illumination device that executes various visual effects using illumination (light), such as turning on, flashing, turning off, and changing colors as appropriate. The speaker SP is a well-known audio output device that executes auditory effects by reproducing (outputting) various audio. The smoke machine SU is a well-known device that executes a visual effect by generating an appropriate amount of smoke. The camera CA is a well-known device that shoots video (proceedings of the game event). The monitor MO is a well-known display device that displays various images (including images for effect and various information). As appropriate, the monitor MO may display, for example, a shooting result of the camera CA as an image for effect or game screens provided by each game machine 3. The various effects devices may be, for example, connected to the center server 2 and controlled by the center server 2. When a local system is constructed in the event hall EF, the various effects devices may be connected to and controlled by the local system. In this manner, each effects device may be controlled as appropriate.

There is a situation wherein a user terminal device 4 is connected to the game system 1 via the network NT. The user terminal device 4 is a computer device that can connect to a network and is for individual use by a user. The user terminal device 4 can, by being loaded with various computer software, have the user receive various services provided by the center server 2. For example, the user terminal device 4 functions as a display terminal that can display various moving images in conjunction with the execution of a predetermined application (software). An appropriate computer device may be used as the user terminal device 4. In the example of FIG. 1, user terminal devices such as a mobile terminal device 4A such as a mobile phone (including a smartphone), a mobile tablet terminal device 4B, and a laptop (may also be a desktop) personal computer 4C are illustrated. These are connected as appropriate to the network NT through, for example, an access point AP and so on. Incidentally, in addition, various computer devices that can connect to a network and are for individual use by a user, such as a stationary consumer game machine or a mobile game machine, may be used as appropriate as the user terminal device 4.

When the user terminal device 4 connected to the game system 1 functions as a display terminal, a video distribution system is constructed in the game system 1 through appropriate server units 2A, 2B, . . . of the center server 2. That is, in this situation, the game system 1 includes a video distribution system. The video distribution system is a system for distributing proceedings of the game event to the user of the user terminal device 4. In the video distribution system, as the proceedings of the game event, various video (moving images), such as appropriate game screens displayed by the game machines 3, the shooting result shot by the camera CA, or an appropriate combination thereof (including video edited as appropriate), is distributed to the user terminal device 4. As such, the various devices installed in the event hall EF, such as the game machines 3 or the camera CA, may be connected as appropriate to the video distribution system (center server 2). In the example of FIG. 1, the game machines 3 are connected. In this situation, the video distribution system acquires, from the game machines 3 and as appropriate, information on various game proceedings including game results (including replay-data information for reproducing game screens) or image data capturing a game screen and distributes to the user terminal device 4 video based on the acquisition result (also referred to as "game video" hereinbelow) as the proceedings of the game event.

The center server 2 provides various device services to the game machines 3. The device services include an information acquisition service that acquires, from each game machine 3, information on play proceedings of each player P (including replay data and image data). Moreover, when, for example, play-performance information of each player P is managed via various data such as play data, the device services may include a data update service whereby such data reflect the play-proceedings information. Moreover, when the various effects devices are controlled by the center server 2, the device services may include a service that controls the various effects devices. For example, when the shooting result of the camera CA is used in the video distribution system, the device services may include a control service that controls a shooting condition of the camera CA (such as a shooting direction, a shooting range, an angle of view, or a shooting period) and a video recording service that acquires the shooting result and records the shooting result as moving-image data.

Likewise, the center server 2 provides various web services to the user of the user terminal device 4 via the network NT. The web services include various services provided via the video distribution system and include, for example, a video distribution service, video-related services, and a billing service. The video distribution service is a service that distributes the game video to the user terminal device 4. The video distribution service may be configured to distribute moving-image data, for displaying the game video, to the user terminal device 4 as appropriate. As one example, the video distribution service is configured to distribute on demand by using packet communication. Moreover, such game video may be recorded video that is a recording of past play proceedings. However, as an example, current play proceedings are distributed as live video that is distributed live (substantially in real time). That is, game-play proceedings of the game event are streamed on demand substantially in real time to the user terminal device 4 as the game video through the video distribution service.

The video-related services are services related to the game video that is distributed through the video distribution service. The video-related services may include, as appropriate, various services related to the game video. As one example, a region selection service is included. The region selection service is a service for imparting to a viewer a selection opportunity for selecting at least one among a plurality of regions set in a game screen of the game being played via the game machines 3 and imparting a privilege according to the selection result and actual game-play proceedings. In such a region selection service, region selection may be provided for free. However, as one example, region selection is provided in exchange for payment of a predetermined consideration. Details of the region selection service are described below.

The billing service is a service for collecting various charges from each user of the user terminal device 4 through a well-known settlement process. Such charges include various considerations according to a content of the web service such as the video distribution service or the video-related service. As one example, a consideration for region selection in the region selection service is included. That is, a consideration (charge) required in the region selection service is collected through the billing service. Incidentally, the web services may additionally include, for example, a data distribution service that distributes various data or software (including data updates and other updates) to each user terminal device 4, an ID imparting service that imparts user IDs for identifying each user, or an authentication service that receives user identification information from the user terminal device 4 and authenticates the user.

Figure 2:
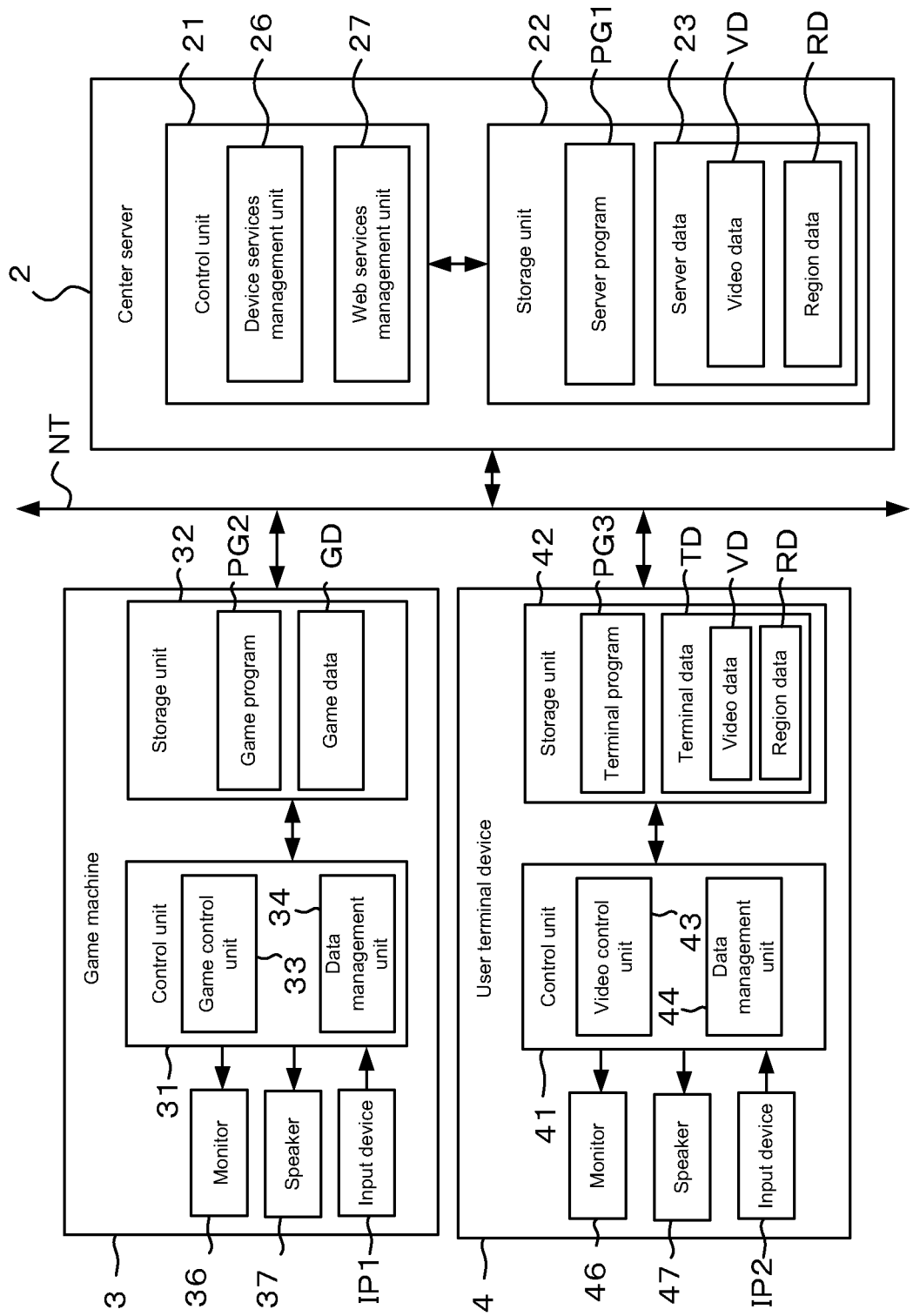
FIG. 2 is a functional block diagram illustrating main portions of a control system of the game system.

Next, main portions of a control system of the game system 1 are described with reference to FIG. 2. First, the center server 2 is provided with a control unit 21 and, as an example of a storage device, a storage unit 22. The control unit 21 is configured as a computer combining a CPU, as one example of a processor that executes various computational processes and operational controls according to a predetermined computer program; an internal memory necessary for the operations; and other peripheral devices.

The storage unit 22 is an external storage device realized by a storage unit including a nonvolatile storage medium (computer-readable storage medium) such as a hard-disk array. The storage unit 22 may be configured to hold all data in one storage unit or may be configured to store the data dispersed across a plurality of storage units. As one example of a computer program that causes the control unit 21 to execute various processes necessary to provide various services to the user, a server program PG1 is recorded in the storage unit 22. Moreover, server data 23 necessary to provide various services are stored in the storage unit 22. The server data 23 include various data necessary to provide the device services or the web services. In the example of FIG. 2, video data VD and region data RD are illustrated, the video data VD and the region data RD respectively being one type of such various data.

The video data VD are well-known moving-image data for displaying the game video on the user terminal device 4. The video data VD are generated based on, for example, image data for displaying a game screen. The region data RD are data for defining a plurality of regions set in a game screen. The region data RD are used, for example, to present options at a selection opportunity provided through the region selection service. Details of the region data RD are further described below. Incidentally, the server data 23 may, for example, additionally include various data for realizing various services. For example, such data may include, for example, the above play data or ID management data for managing various IDs such as user IDs. However, illustration thereof is omitted.

The control unit 21 is provided with a device services management unit 26—as a logical device realized by a combination of hardware resources of the control unit 21 and, as an example of software resources, the server program PG1—and a web services management unit 27. The device services management unit 26 executes various processes for realizing the above device services for the game machine 3. Meanwhile, the web services management unit 27 executes various processes for realizing the above web services—such as the video distribution service, the video-related services, or the billing service—for the user terminal device 4. For example, the web services management unit 27 executes, as a process for realizing the video distribution service, a well-known process that realizes game-video streaming. Moreover, the web services management unit 27 executes, as a process for realizing the billing service, a well-known billing process (including linking to another billing system).

Likewise, the web services management unit 27 executes, as processes for realizing the video-related services, appropriate processes according to contents of the provided services. The processes include a process for realizing the region selection service. For example, the web services management unit 27 executes, as the process that realizes the region selection service, a process for providing a selection opportunity and a process for imparting a privilege according to the selection result. The processes may include, as appropriate, various processes. As one example, a region selection process, a privilege imparting process, and a probability changing process are included. Details of procedures of the region selection process, privilege imparting process, and probability changing process are described below. Incidentally, an input device such as a keyboard, an output device such as a monitor, and the like can be connected as necessary to the control unit 21. However, illustration thereof is omitted.

Meanwhile, the game machine 3 is provided with a control unit 31 as an example of a computer and with a storage unit 32 as an example of a storage device. The control unit 31 is configured as a computer combining a CPU, as one example of a processor that executes various computational processes and operational controls according to a predetermined computer program; an internal memory necessary for the operations; and other peripheral devices. The control unit 31 is provided with a game control unit 33—as a logical device realized by a combination of hardware resources of the control unit 31 and, as an example of software resources, a game program PG2—and a data management unit 34. The game control unit 33 executes various processes necessary to provide the game (including various processes necessary for the device services to be received). Likewise, the data management unit 34 executes various processes that manage data stored in the storage unit 32 (including various processes necessary for the device services to be received). Such processes include a process for generating or transmitting, for example, image data for displaying game screens for the game video.

The storage unit 32 is an external storage device realized by a storage unit including a nonvolatile storage medium (computer-readable storage medium) such as a hard disk or a semiconductor storage device. Various data, together with the above game program PG2, are recorded in the storage unit 32. In the example of FIG. 2, game data GD are illustrated. The game data GD are data referred to as appropriate for having the user play the game according to the game program PG2. The game data GD may include various data as appropriate, such as audio data for reproducing game audio, image data for displaying a game screen, the above play data, or ID management data.

Furthermore, the game machine 3 is provided, as appropriate, with various output devices and input devices necessary for an arcade game machine, and the various output devices and input devices can be connected to the control unit 31. In the example of FIG. 2, a monitor 36 and a speaker 37 are provided as such output devices, and an input device IP1 is provided as such an input device. The monitor 36 and the speaker 37 are, respectively, a well-known display device that displays various images related to the game, such as game screens for providing the game, and a well-known audio reproduction device that reproduces audio. The input device IP1 is a device for inputting various play actions that the player P executes to play the game. As the input device IP1, various input devices—such as a push-button switch or a touch panel—may be adopted as appropriate according to game type and the like.

The user terminal device 4 is provided with a control unit 41 as an example of a computer and with a storage unit 42 as an example of a storage device. The control unit 41 is configured as a computer combining a CPU, as one example of a processor that executes various processes according to a predetermined computer program; an internal memory necessary for the operations; and other peripheral devices.

The storage unit 42 is an external storage device realized by a storage unit including a nonvolatile storage medium (computer-readable storage medium) such as a hard disk or a semiconductor storage device. As one example of a computer program that causes the control unit 41 to execute various processes necessary to provide various services to the user, a terminal program PG3 is recorded in the storage unit 42. Moreover, terminal data TD necessary to receive the web services, such as game-video display, are recorded in the storage unit 42. The terminal data TD include various data. In the example of FIG. 2, video data VD and region data RD are illustrated, the video data VD and the region data RD respectively being one type of the data. The video data VD and the region data RD are provided from the center server 2 so as to include necessary parts as a portion of the video distribution service (or data distribution service) or the video-related services (or region selection service). Incidentally, the terminal data TD can additionally include, for example, ID management data provided as appropriate from the center server 2. Likewise, the terminal data TD can include, for example, image data for displaying various images related to game-video distribution or audio data for reproducing various audio such as BGM. However, illustration thereof is omitted.

In the control unit 41, various logical devices are configured by combining hardware resources of the control unit 41 and, as an example of software resources, the terminal program PG3. Moreover, various processes necessary to receive the web services are executed through the logical devices. As logical devices related to the various processes, in the example of FIG. 2, a video control unit 43 and a data management unit 44 are illustrated. The video control unit 43 is a logical device that performs various processes for displaying various images (including moving images). Such processes include a process for displaying game video (moving images) (process for receiving the video distribution service), a process for displaying various images related to the game video in order to receive the video-related services, and a process for receiving billing services related to the above. For example, the video control unit 43 executes, as a process for realizing the region selection service included in the video-related services, the region selection process in cooperation with the web services management unit 27 of the center server 2. Meanwhile, the data management unit 44 is a logical device that performs various processes related to managing the terminal data TD recorded in the storage unit 42. Such processes include a process that acquires the video data VD and the region data RD from the center server 2, a process that updates the video data VD and the region data RD as appropriate, or a process that provides (transmits) updated data to the center server 2.

Furthermore, the user terminal device 4 may be provided with various output devices and input devices as appropriate according to a type of, for example, the user terminal device such as the mobile terminal device 4A. In the example of FIG. 2, a monitor 46 and a speaker 47 are illustrated as such output devices, and an input device IP2 is illustrated as such an input device. The monitor 46 and the speaker 47 are, respectively, a well-known display device for displaying various images such as game video and a well-known audio reproduction device for reproducing audio. Moreover, the input device IP2 is a device for the user to input actions for various services. As the input device IP2, an appropriate input device may be used according to the various services. As one example, a touch panel is used. The touch panel is a well-known input device (detection device) that detects a position of a touch operation of the user and outputs a signal according to the position. Through a touch operation on such a touch panel, an appropriate touch operation for using the video distribution service, the video-related services, or the billing service is input. In order to detect such a touch operation, the touch panel is disposed on the monitor 46 so as to cover the monitor 46.

Next, details of the region selection service are described with reference to FIG. 3 to FIG. 8. As above, the region selection service is a service that imparts to a viewer of the game video a selection opportunity and a privilege based on a selection result at the selection opportunity. In other words, it functions as a service that gamifies the game video for the viewer through the selection opportunity and the privilege. As above, the game machine 3 may provide, as appropriate, various games, and the region selection service may be applied as appropriate to the various games. Hereinbelow, a region selection service in a situation wherein the game machine 3 provides a baseball game (sports game) is described.

Figure 3:
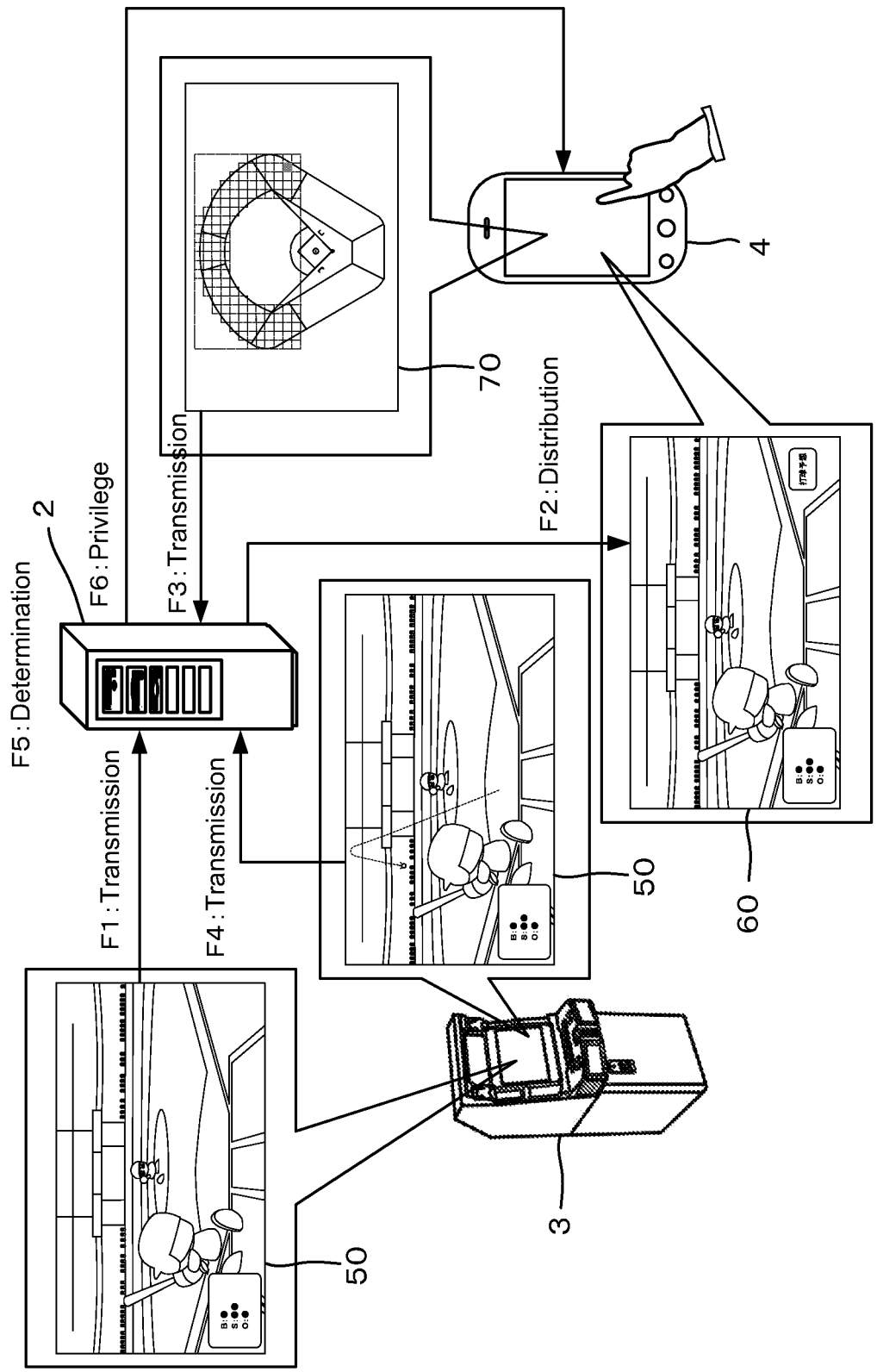
FIG. 3 is an explanatory diagram for describing an overview of a region selection service.

FIG. 3 is an explanatory diagram for describing an overview of the region selection service. The region selection service may be provided as a portion of the video-related services and independently (separately) from the video distribution service. However, the example of FIG. 3 illustrates a situation wherein the region selection service is provided while the video distribution service is being provided (both are provided in parallel). The example of FIG. 3 illustrates one example of procedures for realizing the region selection service in such a situation. In this situation, as illustrated in FIG. 3, the region selection service includes procedures F1 to F6. Specifically, a game screen 50 is displayed, for game play, on the monitor 36 of each game machine 3. First, data for distributing such a game screen 50 as the game video are transmitted from each game machine 3 to the center server 2 (F1). When video data VD are generated on a game-machine 3 side, for example, as such data, the video data VD may be transmitted to the center server 2. In this manner, the game machine 3 may transmit appropriate data to the center server 2 as long as the game screen 50 can be displayed. As one example, image data wherein the game screen 50 is captured on demand (for example, at a predetermined refresh rate) are transmitted to the center server 2.

Meanwhile, upon acquiring the image data from each game machine 3, the center server 2 generates the video data VD for displaying the game video and distributes the game video based on the video data VD to the user terminal device 4 (F2). The video data VD may be configured to display as the game video only the game screen 50 of one among the two game machines 3. However, as one example, the video data VD are generated to display game video including, as appropriate, two game screens 50 respectively corresponding to the two game machines 3. The game video may be additionally processed as appropriate by, for example, enlarging one of the game screens 50, focusing on a portion, or fading out. Such game video may be viewed as appropriate on the user terminal device 4. However, as one example, such game video is viewed through a viewing screen 60. Details of the viewing screen 60 are described below.

When a predetermined touch operation requesting a selection opportunity is executed on the viewing screen 60, a selection screen 70 is displayed on the monitor 46 of the user terminal device 4. The selection screen 70 is a screen for providing the selection opportunity. Specifically, the selection screen 70 is a screen for the viewer to select a desired region from among a plurality of regions set in the game screen 50. Region selection on the selection screen 70 may be provided for free. However, as one example, as above, region selection is provided in exchange for a predetermined consideration. As such, each viewer selects a desired region (option) while paying the consideration through the billing service on the selection screen 70. A selection result on the selection screen 70 is transmitted to the center server 2 (F3). Details of the selection screen 70 are described below.

Meanwhile, in the game provided by each game machine 3, advancements (progress) can be made as appropriate according to play actions of each player P. Such advancements include events that occur according to predetermined rules (also referred to hereinbelow as "advancement events" to distinguish them from actual events such as game events). For example, in the baseball game, various batting-such as a hit, a foul, or a home run—can occur as a pitcher and a batter play each other. The various batting is decided according to parameters of the pitcher and the batter; when the player P is operating the batter or the like, a timing of the operation; and the like. That is, a direction, distance, speed, and the like of the batting are decided according to predetermined rules (algorithms or probabilities) that use various parameters and the like, and the batting is classified as a hit or the like. As such, such batting functions as a type of advancement event. Likewise, various advancement events such as a runner stealing a base can occur in the baseball game. Each game machine 3 transmits, as appropriate, various play-proceedings information including such advancement-event information to the center server 2 (F4).

Upon acquiring the play-proceedings information from each game machine 3, the center server 2 determines, based on the play-proceedings information, whether the selection result of the viewer meets a privilege condition (F5). The privilege condition may be configured as appropriate. As one example, it is met when predetermined play proceedings occur in the region selected by the viewer. As such predetermined play proceedings, appropriate play proceedings may be used that occur in association with each region of the game screen 50 (options at the selection opportunity). As one example, advancement events that occur in association with each region are used. That is, the privilege condition is met when an advancement event occurs in association with the region selected at the selection opportunity. As above, the advancement events include various advancements. As one example, batting is used as the privilege condition, the privilege condition being met when the ball is batted to the region selected at the selection opportunity. Then, when the privilege condition is met—that is, when the ball is batted to the region selected at the selection opportunity—the center server 2 imparts the privilege to the viewer of the user terminal device 4 (F6). The region selection service may gamify the game video as appropriate according to the type of game provided by the game machine 3. As one example, for the baseball game, viewing the game video is gamified by having the viewer predict where such batting will go.

Figure 4:
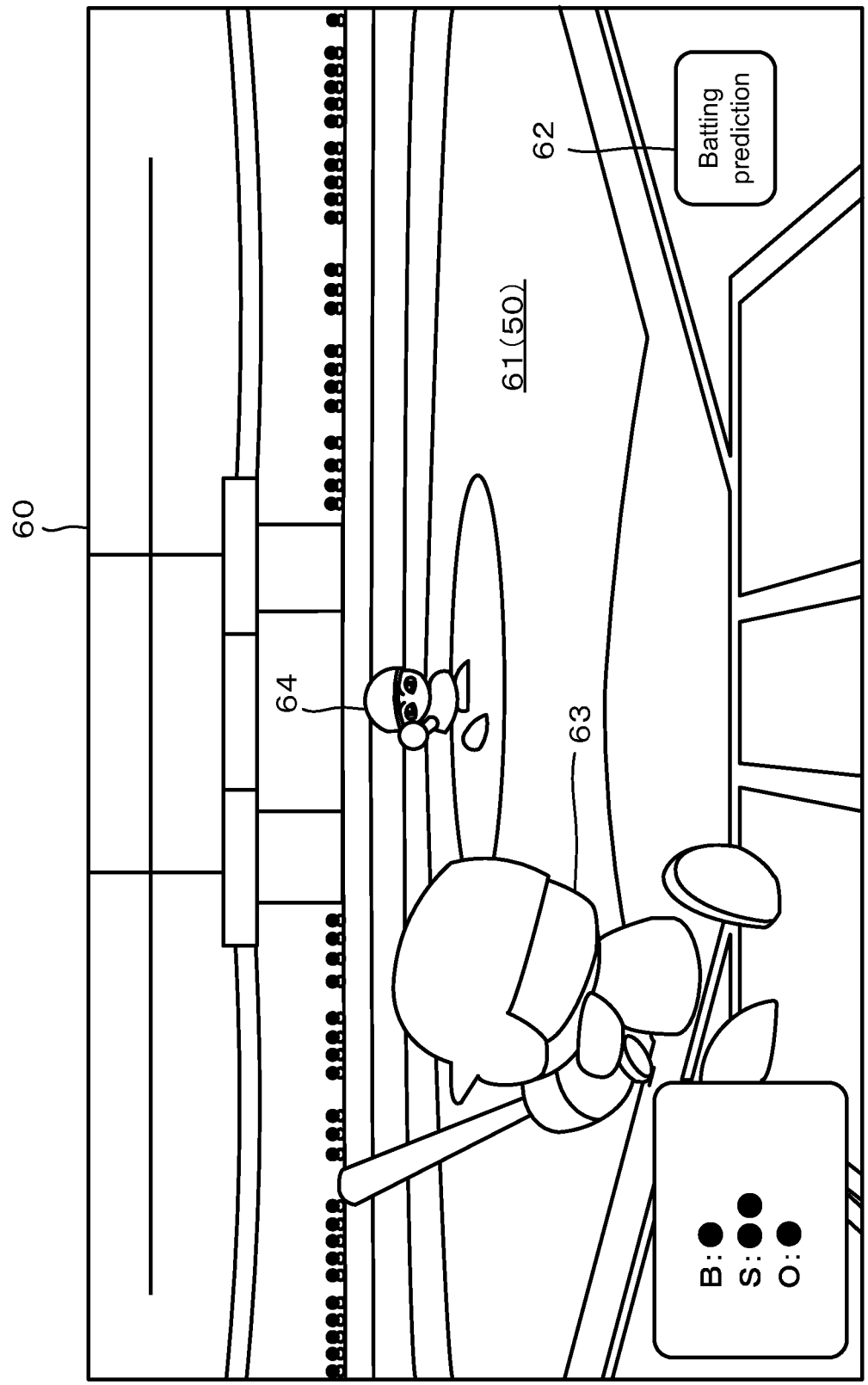
FIG. 4 is a diagram schematically illustrating one example of a viewing screen.

FIG. 4 is a diagram schematically illustrating one example of the viewing screen 60. The viewing screen 60 may function as a selection screen for realizing a selection opportunity. That is, regions that function as options may be set in the game video (game screen) included in the viewing screen 60, and selection of each region may be executed through a touch operation of each region. However, the example of FIG. 4 illustrates the viewing screen 60 in a situation wherein a screen separate from the viewing screen 60 (selection screen 70) is used as the selection screen. In this situation, as illustrated in FIG. 4, the viewing screen 60 includes a video region 61 and a batting prediction icon 62.

The video region 61 is a region for displaying the game video. As above, the game video may combine, as appropriate, the two game screens 50 of the two game machines 3. However, in the example of FIG. 4, the game video is constituted by only the game screen 50 corresponding the game machine 3 on the offensive side. In this situation, the game screen 50 displayed on the offensive-side game machine 3 is displayed as—is in the video region 61. The game screen 50 includes a pitcher character 64 as an example of a pitcher who pitches the ball and a batter character 63 as an example of a batter who bats the ball pitched by the pitcher. Moreover, the offensive-side game screen 50 is configured to correspond to a shooting result wherein the field is shot from a perspective of the catcher (or the umpire). As such, the example of FIG. 4 displays a game screen 50 corresponding to the perspective of the catcher so a back side of the batter character 63 and the front of the pitcher character 64 are each displayed in the video region 61.

Meanwhile, the batting prediction icon 62 is an icon (image) indicating a touch position for requesting a selection opportunity. That is, when a position of the batting prediction icon 62 is touch-operated, the viewer of the viewing screen 60 is provided with a selection opportunity. More specifically, when the batting prediction icon 62 is touch-operated, the selection screen 70 is displayed.

Figure 5:
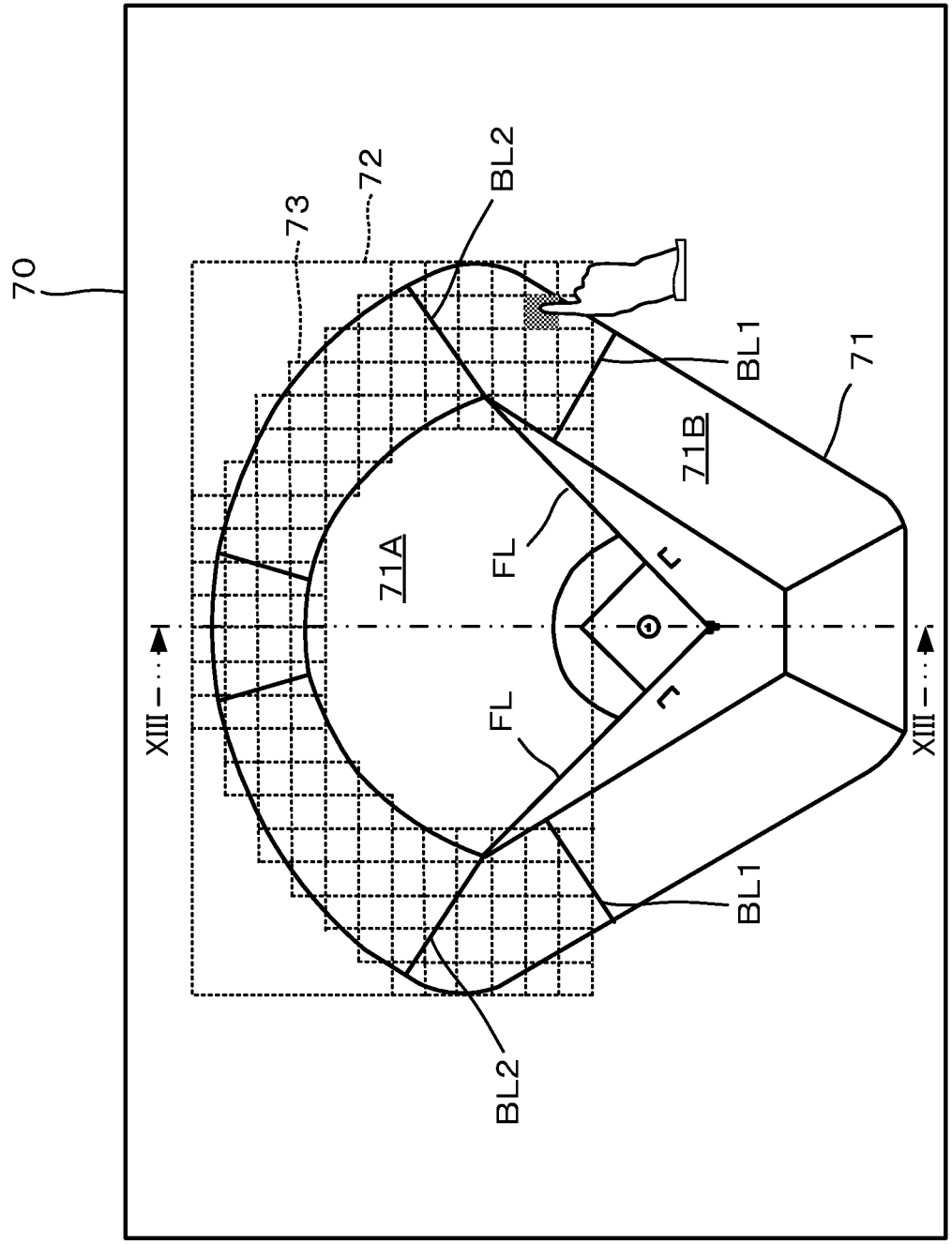
FIG. 5 is a diagram schematically illustrating one example of a selection screen.

FIG. 5 is a diagram schematically illustrating one example of the selection screen 70. In the baseball game, a plurality of types of hits and the like is included as the batting that occurs as advancement events, and the various batting may be used as privilege-condition requirements. For example, only home runs may be used as a privilege-condition requirement. However, described below as one example is a situation wherein in addition to home runs, foul balls that fly into the outfield stands (a portion of foul balls) are also used as a privilege-condition requirement (advancement event). The example of FIG. 5 illustrates the selection screen 70 displayed in such a situation.

Furthermore, as above, the selection screen 70 is displayed to realize a selection opportunity. At the selection opportunity, options are set to predict a location whereto the ball will be batted. As such, at the selection opportunity, a plurality of options each corresponding to a plurality of locations (regions) included in the game screen 50 is prepared. Such options may be prepared separately from each location (each location may be selected indirectly). However, the example of FIG. 5 illustrates the selection screen 70 in a situation wherein each location is used directly as an option (each location is directly selected). Moreover, in the selection screen 70, the game screen 50 may be displayed directly (as—is) so as to include such locations. However, a screen separate from the game screen 50 may be displayed as long as such locations are included. As such a separate screen, for example, a screen wherein the same game field as the game screen 50 is shot according to a separate shooting condition (such as a different angle, field of view, or shooting direction) (or a screen resembling such) may be used. Moreover, such a separate screen may be a screen that cannot be displayed on the game machine 3 as a game screen. In this manner, an appropriate screen may be used as the selection screen 70 as long as locations identical to the locations included in the game screen 50 are included (the locations may be conceptually identical locations). The example of FIG. 5 illustrates a situation wherein such a separate screen is used as the selection screen 70. In this situation, as illustrated in FIG. 5, the selection screen 70 includes a stadium image 71.

The stadium image 71 is an image illustrating a stadium functioning as the game field of the baseball game. On the selection screen 70, a stadium image 71 wherein such a stadium is shot according to an appropriate shooting condition may be displayed. The example of FIG. 5 displays a stadium image 71 corresponding to a shooting result of when the stadium is shot from overhead as a plan view. Such a stadium image 71, although not necessarily displayed on the game screen 50, illustrates an entirety of the same stadium (game field) as the game screen 50 and therefore includes locations identical to the locations included in the game screen 50 (the same locations under a different shooting condition).

Specifically, the stadium image 71 includes a grounds region 71A and a spectator region 71B. The grounds region 71A is a region that functions as a field whereon athletes such as the batter play (play baseball). The spectator region 71B is a region set as stands for spectators to spectate baseball in a baseball match. In the stadium image 71, the spectator region 71B is formed on an outer side of the grounds region 71A so as to surround the grounds region 71A. The game screen 50 also obviously includes the grounds region 71A and the spectator region 71B. However, only a portion thereof is displayed as a shooting result shot from a different angle (angle resembling the field of view of the catcher). Meanwhile, an entirety of both regions is displayed in the selection screen 70 in the example of FIG. 5.

An options region 72 is set in the stadium image 71. The options region 72 is a region that functions as the options at the selection opportunity (locations to be selected). The options region 72 may be set as appropriate in the stadium image 71. As one example, it is set only in a part (range) corresponding to outfield stands of the spectator region 71B (between left and right first boundary lines BL1 positioned so as to indicate a boundary with infield stands). Specifically, the outfield stands include a home-run region determined to be a home run (between left and right second boundary lines BL2 positioned as extensions of left and right foul lines FL) and a foul region determined to be a foul (left and right regions between the first boundary line BL1 and the second boundary line BL2). As such, the options region 72 is set as a range (region) reachable by home runs and by foul balls that fly into the outfield stands.

The options region 72 is classified into a plurality of individual option regions 73. Each individual option region 73 among the plurality of individual option regions 73 functions as an option at the selection opportunity. That is, each viewer decides on an individual option region 73 (option) they would like to select through a touch operation of each individual option region 73. Each individual option region 73 may be formed in an appropriate form (size, shape, and the like), and according to such a form and the like, an appropriate number of individual option regions 73 may be provided in the options region 72. For example, each individual option region 73 may be formed in an appropriate shape—such as a circle, an oval, a column, a cone, or various polygons—and size. In the example of FIG. 5, each individual option region 73 is formed, based on a size of the ball in the baseball game, in a square shape wherein both sides have a length of several balls. In this example, the plurality of individual option regions 73 functions as both the plurality of regions and the plurality of options in the present invention. Moreover, in this example, the viewer functions as the user in the present invention.

Furthermore, the form of each individual option region 73 may be changed as appropriate according to various conditions such as game-play proceedings, characteristic information related to user characteristics, various ranges such as infield or outfield (region attributes), or random conditions. Specifically, for example, the size of each individual option region 73 may increase or decrease when baseball game proceedings are in the clutch or present a scoring chance or when the game is at a specific inning such as the seventh inning (in a specific period) (for example, in terms of the individual option regions 73 in the example of FIG. 5, at a specific inning, each individual option region 73 is set to a size corresponding to two or more individual option regions 73, and at normal innings, each individual option region 73 is set to a size corresponding to one individual option region 73). Moreover, the forms (ranges) may differ according to region (attributes thereof), as in a foul range being small and a home-run range being large.

Likewise, the form of each individual option region 73 may be changed according to various characteristic information such as a viewer billing amount (including a total billing amount or an individual billing amount); a view count; when comments are enabled for the game video, a number of comments; a blacklist, according to appropriate conditions; viewers managed according to a viewer ranking or the like; various attribute information including a physical build of each viewer (for example, input by each viewer) and so on. In the above situation, the range (form) of each individual option region 73 can be changed according to viewer characteristics. Generally, the wider the range of the individual option region 73, the higher a probability of the ball being batted thereto (of an advancement event occurring therefrom). As such, for example, a viewer having a high usage frequency of selection opportunities can be given preferential treatment by making the range of each individual option region 73 wider than normal for the viewer. That is, a specific viewer can be given preferential treatment or less preferential treatment through changes in the ranges of each individual option region 73. As a result, use of the selection opportunities can be promoted through such preferential treatment. The form of the individual option regions 73 set for each viewer in this manner may be changed as appropriate. However, as one example, a uniform form is set. That is, the same number of individual option regions 73 having square shapes of the same size is set in the options region 72 for all viewers.

At the selection opportunity, selection of each individual option region 73 may be free. However, as one example, selection is provided for a fee as above. Moreover, the selection opportunity may be restricted to one person selecting one individual option region 73 or restricted to only one viewer being able to select a certain individual option region 73. However, as one example, each viewer is allowed to select a plurality of individual option regions 73, and the selections are allowed to overlap (one individual option region 73 is allowed to be overlappingly selected by a plurality of viewers). Selection of the plurality of individual option regions 73 may be allowed as appropriate and may, for example, be changed according to an amount paid by each viewer. In such a change, for example, a number of selectable individual option regions 73 may increase exponentially as the payment amount increases. However, as one example, the change is set to be linear so the number of selectable individual option regions 73 increases by one each time a certain amount is paid. That is, in selecting one individual option region 73, a certain amount is billed, and in selecting a plurality of individual option regions 73, an amount wherein the certain amount is summed a corresponding number of times is billed. As such, in the selection screen 70, individual option regions 73 are selected. Afterward, the selection is decided on, and an appropriate intermediate procedure (process), such as billing of a consideration corresponding to the selection, is performed, thereby establishing the individual option regions 73 selected by the viewer.

Furthermore, the individual option regions 73 selected on the selection screen 70 may be used only to determine the privilege condition. However, as one example, the individual option regions 73 are also used as appropriate for other purposes. Such other purposes include, for example, designating a spectating point. That is, an individual option region 73 selected on the selection screen 70 functions as a spectating point of the viewer who selected the individual option region 73. More specifically, the game video is displayed so as to reproduce the stadium as seen from the individual option region 73 selected on the selection screen 70. That is, game video (a game screen) corresponding to the stadium as seen from the individual option region 73 selected on the selection screen 70 is displayed in the video region 61 of the viewing screen 60. In other words, a perspective (range of a spectating field of view) of the game video (game screen) displayed on the viewing screen 60 is switched according to the selection result on the selection screen 70.

Furthermore, when a plurality of individual option regions 73 is selected on the selection screen 70, the spectating point may be switched as appropriate between the individual option regions 73 through a predetermined priority ranking or the like. However, as one example, any one individual option region 73 selected by the viewer is set as the spectating point (in this situation, the individual option regions 73 may be set in ranges in units of stands or may be set in a manner unrelated thereto). In the example of FIG. 5, an individual option region 73 that is the second from the right end of the options region 72 and two above from the lower end of the options region 72 (the dot-patterned individual option region 73) is touch-operated. In this situation, game video corresponding to the stadium as seen from the spectating point is displayed in the video region 61 of the viewing screen 60. An effect of the selection on the selection screen 70—in other words, the determination of the privilege condition (effect of batting prediction)—and the spectating point may be, for example, applied in player units, at-bat units, or inning (may be offensive-side innings alone or both top and bottom innings) units. In this manner, the effect of the selection on the selection screen 70 may be applied in an appropriate range (units). As one example, the effect is applied in match units. That is, once selected, the batting-prediction effect and the like continue (are maintained) until the end of the match (changing the selected individual option region 73 may be allowed). In this example, the dot-patterned individual option region 73 functions as both the one option and the corresponding region in the present invention.

Figure 6:
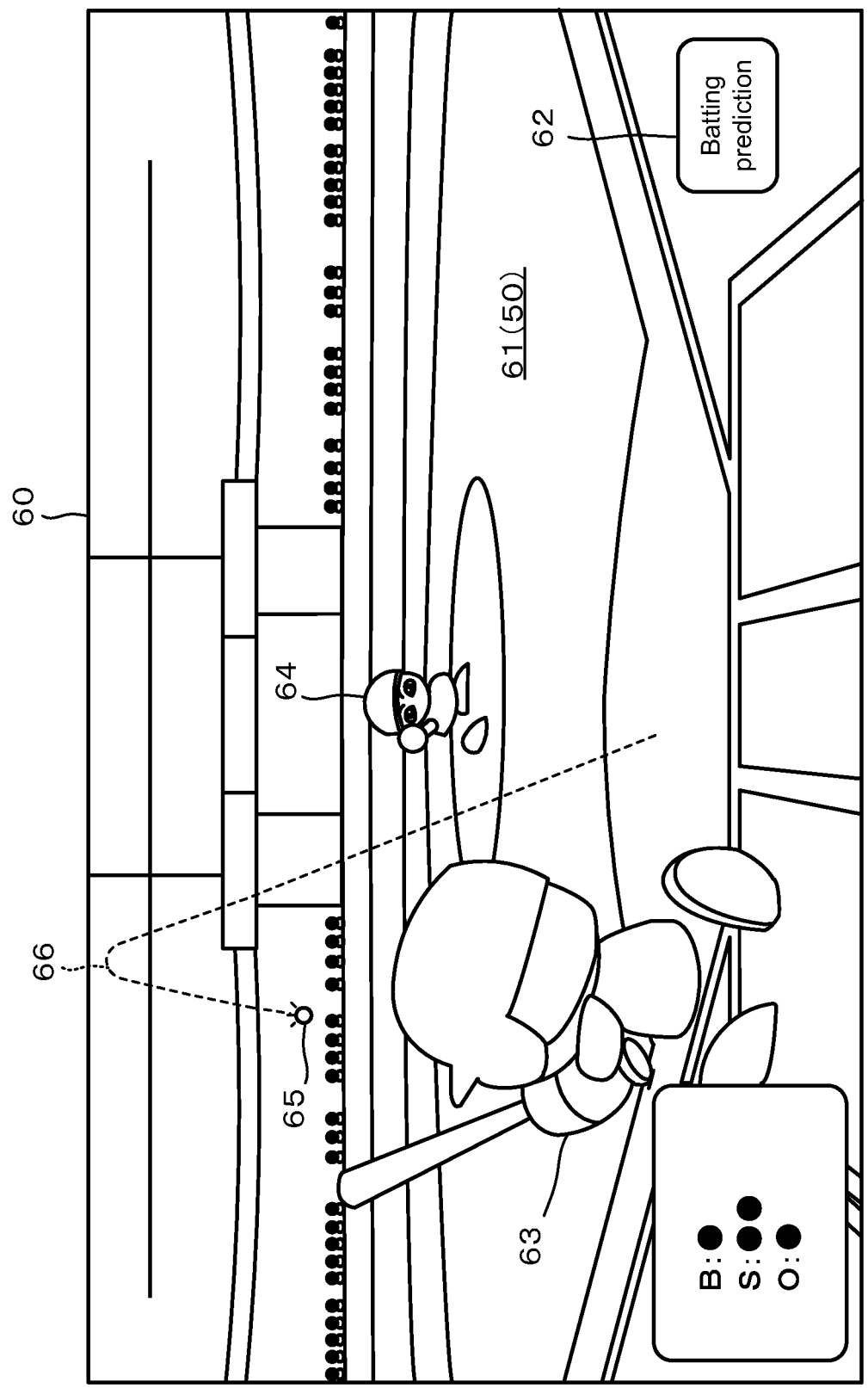
FIG. 6 is an explanatory diagram for describing an advancement event as an example of a privilege condition.

FIG. 6 is an explanatory diagram for describing an advancement event as an example of a privilege condition. Specifically, the example of FIG. 6 schematically illustrates one example of the viewing screen 60 in a situation wherein a home run occurs as the batting (advancement event) in the example of FIG. 4. Moreover, as above, game video corresponding to the perspective from the individual option region 73 selected on the selection screen 70 (when a plurality of regions is selected, one appropriate region or the like) may be displayed in the video region 61. In the example of FIG. 6, for convenience in description, the game screen 50 (game video) as seen from the same perspective as FIG. 4 is displayed in the video region 61. As illustrated in FIG. 6, in contrast to the example of FIG. 4, a ball image 65 is added in the video region 61. More specifically, the ball image 65 is displayed so as to draw a trajectory 66 of a home run (also referred to as "home-run trajectory 66" hereinbelow). Such a home-run trajectory 66 (may be visually displayed or not visually displayed) is generally formed to extend from a batting point by the batter character 63 to the outfield stands (home-run region). As the advancement event, as above, various batting by the batter character 63 can occur. When a home run occurs, such a ball image 65 is displayed. In this situation, an appropriate effect such as enlarged display of the ball image 65 may be added in the video region 61.

Figure 7:
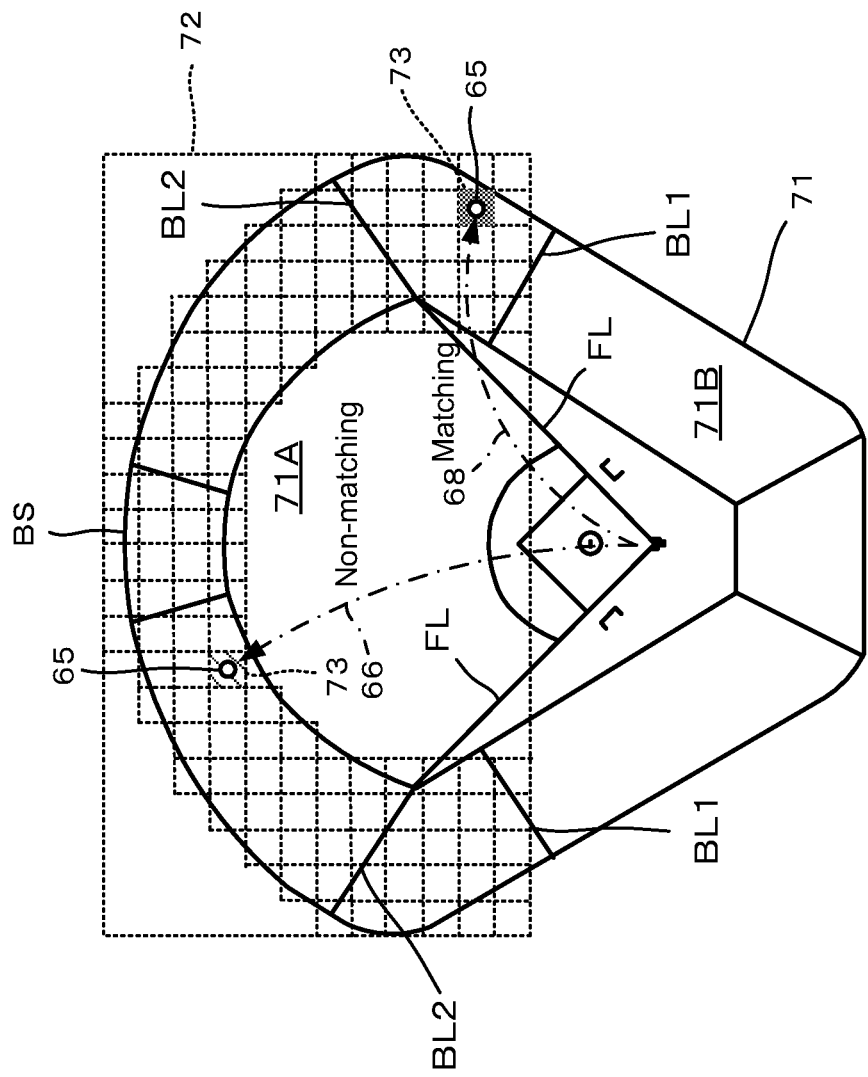
FIG. 7 is an explanatory diagram for describing a relationship between batting and the privilege condition.

FIG. 7 is an explanatory diagram for describing a relationship between batting and the privilege condition. The various batting, including home runs, occurs in a stadium presented using effects that render a virtual, three-dimensional space. As such, the various batting occurs three-dimensionally in the virtual, three-dimensional space as in, for example, the home-run trajectory 66 illustrated in the example of FIG. 6. As such, each individual option region 73 may be set in an appropriate range of such a virtual, three-dimensional space (including the grounds). As a result, the privilege condition may be met as appropriate between such various individual option regions 73 and the batting. Specifically, when a net for preventing a foul ball from entering the stands (including the infield stands) is provided in the stadium, appropriate individual option regions 73 may be provided on the net in the virtual, three-dimensional space, and an individual option region 73 corresponding to a region of the net hit by the foul ball may meet the privilege condition. Alternatively, for example, appropriate individual option regions 73 may be provided above the grounds, and, among the individual option regions 73, for example, individual option regions 73 including the home-run trajectory 66 in the example of FIG. 6 (individual option regions 73 where through the ball image 65 passes) may meet the privilege condition. Alternatively, only individual option regions 73 in the spectator region 71B that include a trajectory among various batting trajectories (home runs and various fouls including the infield stands) may be provided as the options in order to meet the privilege condition.

The relationship between batting and privilege-imparting may be set as appropriate as above. When individual option regions 73 are selected through the selection screen 70 in the example of FIG. 5, an individual option region 73 that includes, among a batting trajectory such as the home-run trajectory 66, an arrival position meets the privilege condition. The example of FIG. 7 illustrates a relationship between batting and privilege-imparting corresponding to the selection result in FIG. 5 in such a situation. Specifically, as illustrated in FIG. 7, in this situation, the privilege condition is met when the arrival position of the batting is included in the individual option region 73 in the example of FIG. 5—in other words, when the batting arrival position and the selected individual option region 73 match. For example, when the same home run as the example of FIG. 6 occurs, the ball image 65 draws the home-run trajectory 66, and an arrival position of the ball image 65 (home run) is included in an individual option region (individual option region hatched using rightwardly diagonal lines) 73 near a left side of a centerfield screen BS. In this situation, the individual option region 73 including the arrival position does not match the individual selection region (dot-patterned individual selection region) 73 in the example of FIG. 5. In this situation, the privilege condition is not met. In this example, the individual option region 73 of the rightwardly diagonal lines functions as the portion of the regions in the present invention.

Meanwhile, for example, when a foul ball that flies into the outfield stands occurs as the batting so as to draw a trajectory 68 (also referred to as "foul trajectory 68" hereinbelow), an arrival position of the ball image 65 drawing the foul trajectory 68 is included in the individual selection region (dot-patterned individual selection region) 73 in the example of FIG. 5. That is, the individual option region 73 including the arrival position of the foul trajectory 68 (foul ball) matches the individual selection region (dot-patterned individual selection region) 73 in the example of FIG. 5 (an entirety thereof is included in the dot-patterned individual option region 73). In this situation, the privilege condition is met. Moreover, when two or more individual option regions 73 are selected at the selection opportunity, the same determination (matching, non-matching) is executed for the individual option regions. That is, when the two or more individual option regions 73 include the individual option region 73 corresponding to the arrival position, matching is determined, and when the two or more individual option regions 73 do not include such, non-matching is determined. Moreover, when the dot-patterned individual option region 73 is selected overlappingly by a plurality of viewers at the selection opportunity, the privilege condition may be met by only one viewer specified according to an appropriate condition from among the plurality of viewers. However, as one example, all viewers meet the privilege condition.

The privilege imparted when the privilege condition is met may be the same between a situation wherein the individual option region 73 selected at the selection opportunity corresponds to an arrival position of a home-run ball and a situation wherein correspondence is to an arrival position of a foul ball. However, as one example, different privileges are imparted for the two situations. Specifically, when the individual option region 73 selected at the selection opportunity corresponds to an arrival position of a home-run ball, a privilege of a higher value is imparted than when the region corresponds to an arrival position of a foul ball. That is, privileges of different values are imparted between a situation wherein the individual option region 73 selected at the selection opportunity corresponds to an arrival position of a home-run ball and a situation wherein correspondence is to an arrival position of a foul ball. In this situation, the same consideration may be set for selection of an individual option region 73 corresponding to a foul ball and selection of an individual option region 73 corresponding to a home-run ball. However, as one example, different considerations are set. That is, different considerations are required according to each individual option region 73 (in other words, a privilege value of when a prediction is correct).

Furthermore, as above, the batting arrival position is decided according to predetermined rules, and a probability of the ball image 65 reaching the individual option region 73 selected at the selection opportunity may be uniform or variable. As one example, the probability is set to be variable. Changes in the probability may occur as appropriate according to various change conditions such as game-play proceedings, viewer (or player P) characteristics, viewer actions, or random conditions. For example, the probability may change according to play proceedings such as a specific inning or specific proceedings (for example, when the proceedings are in the clutch or present a scoring chance). In this manner, the probability may change as appropriate according to various change conditions. As one example, an item that affects the probability is prepared, and the probability changes in conjunction with use of the item. The item may be for the viewer or the player P. As one example, it is used by the viewer. That is, the change condition is met in conjunction with an action by the viewer of using the item, and the probability of the ball image 65 reaching the selected individual option region 73 changes.

Furthermore, the probability change may be realized by changing the predetermined rules. As one example, the probability change is realized as a change in the arrival position. Specifically, such a probability change occurs on the game screen 50 (or may occur only in the game video) as, for example, wind that affects the arrival position of the ball image 65 (corrects shifting in a predetermined range). Moreover, when the item is used, the arrival position is corrected as an effect of wind so the ball image 65 reaches the individual option region 73 selected at the selection opportunity in a category of the predetermined range. That is, when the viewer uses the item, the probability of the ball image 65 reaching the individual option region 73 selected at the selection opportunity increases. Moreover, the predetermined range may be set as appropriate. As one example, the predetermined range is set as a range of a predetermined number of individual option regions 73 positioned in front of and behind or to the left and right of the arrival position. Such an item (may have an efficacy restricted as appropriate, such as only once or only one inning) may be imparted as appropriate to the viewer. As one example, such an item is purchased in exchange for a predetermined consideration through an appropriate purchase screen. As one example, such a relationship is set between the batting and the privilege condition. Moreover, the viewing screen 60 is gamified by having the arrival position of a home-run ball or of a foul ball that flies into the outfield stands be predicted. Incidentally, the batting trajectory and the arrival position may be decided as appropriate, and the item may impart an appropriate effect according to various deciding methods thereof. For example, the batting trajectory and the arrival position may be decided by a physics computation according to various conditions such as an initial speed and angle of the batting. In this situation, use of the item affects the various conditions such as the wind, and the batting trajectory and the arrival position may, for example, be decided based on the various conditions after the item is used.

Furthermore, the privilege condition may have as a requirement only a position condition that is met when the individual option region 73 selected at the selection opportunity includes the arrival position of the ball image 65, and the privilege condition may be met automatically in conjunction with the position condition being provided. However, as one example, another requirement is also included. As such a requirement, an appropriate condition such as a frequency condition or a game condition may be used. For example, the frequency condition is a condition that is met when a frequency that is counted each time providing of a position condition is met exceeds a predetermined frequency (including both a continuous frequency and a total over a predetermined period). That is, when the privilege condition includes as a requirement the frequency condition being provided, the privilege condition is met when the predetermined frequency is exceeded and the position condition is met. Meanwhile, the privilege condition is not met at or below the predetermined frequency. Specifically, for example, when a total of two times is adopted as the predetermined frequency, the privilege condition is not met the first two times the individual option region 73 selected as the selection opportunity and the arrival position of the ball image 65 match (at or below the predetermined frequency), and the privilege condition is met when the matching exceeds two times (predetermined frequency).

Meanwhile, the game condition is a condition that is met according to a result of a mini game. That is, when the privilege condition includes the game condition as a requirement, the mini game is provided to the viewer, and whether the privilege condition is met is determined according to the result of the mini game. As such a mini game, an appropriate game such as roulette, a card game, or a shooting game may be used. As one example, a home-run catching game is used. The home-run catching game is a game of catching a home-run ball through a catching character operated by the viewer. Such a home-run catching game is provided when the position condition is met, to the viewer meeting the position condition. More specifically, the home-run catching game is provided to a viewer for whom the individual option region 73 selected at the selection opportunity and the arrival position of the ball image 65 match, and the privilege condition is met when the catching character catches the home-run ball in the home-run catching game. That is, whether the privilege condition is met is determined according to a result of the home-run catching game.

When the privilege condition includes the frequency condition or the like as a requirement, a privilege that comes with the position condition being provided may be imparted or not be imparted. For example, when a privilege that comes with the position condition being provided (for example, the above mini game being provided may be interpreted as a privilege) is imparted, a value of the privilege may change when the frequency condition or the like is further met. That is, the value of the privilege (including a different privilege per se) may be changed as appropriate—including a situation wherein no privilege is imparted (the value of the privilege is zero)—between a situation wherein only the position condition is met and a situation wherein an additional condition such as the frequency condition is met. In this manner, when the privilege condition includes the frequency condition or the like as a requirement, the privilege may be imparted as appropriate according to a combination with the additional condition such as the frequency condition. As one example, when the position condition is met, no privilege is imparted, and the privilege is imparted only when the additional condition such as the frequency condition is met. That is, no privilege that comes with the position condition being provided is imparted, and, in terms of a presence or absence of the privilege, the privilege differs between a situation wherein only the position condition is met and a situation wherein the additional condition such as the frequency condition is met.

Figure 8:
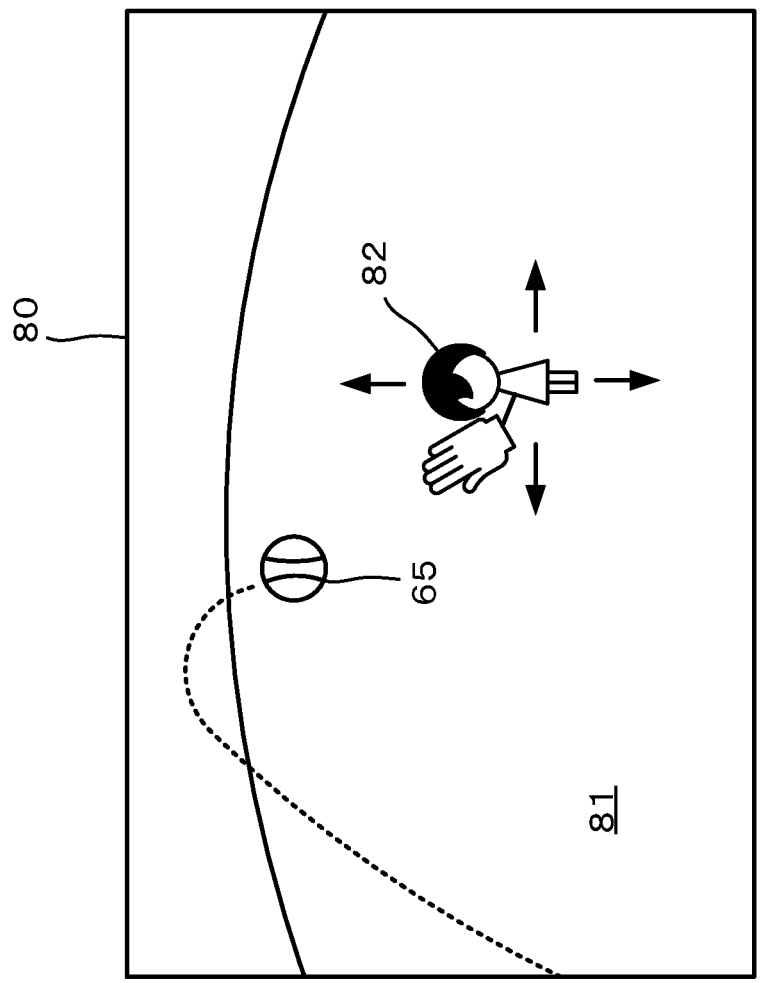
FIG. 8 is a diagram schematically illustrating one example of a game screen for a home-run catching game.

FIG. 8 is a diagram schematically illustrating one example of a game screen for the home-run catching game. As illustrated in FIG. 8, a game screen 80 for the home-run catching game (also referred to as "catching screen 80" hereinbelow) is displayed on the monitor 46 of the user terminal device 4 and includes a catching field 81, a catching character 82, and the ball image 65. The catching field 81 is a field for catching the ball image 65. The catching character 82 is a character that moves as operated by the viewer. The catching character 82 can move within a range of the catching field 81. The ball image 65 is an image indicating the batted ball (ball). Display of the ball image 65 is started as appropriate on the catching screen 80, and the ball image 65 falls onto the catching field 81 so as to indicate the batting arrival position. An operation that matches the falling position (arrival position) and a position of the catching character 82 is sought of the viewer.

Operation of the catching character 82 may be realized as appropriate. For example, the operation may be realized via a touch operation (for example, touch-operating the catching character 82). Alternatively, the operation may (or can be) realized by displaying an operation unit that realizes such an operation (for example, the arrows indicating left, right, up, and down directions in the example of FIG. 8) and by touch-operating the operation unit. In either situation, the privilege is imparted when the falling position (arrival position) of the ball image 65 and the position of the catching character 82 match, and no privilege is imparted in a situation of no matching. As one example, such a home-run catching game is provided. The privilege condition may include, as appropriate, not only the position condition but also various conditions such as such a game condition or the above frequency condition (including a combination thereof).

Figure 9:
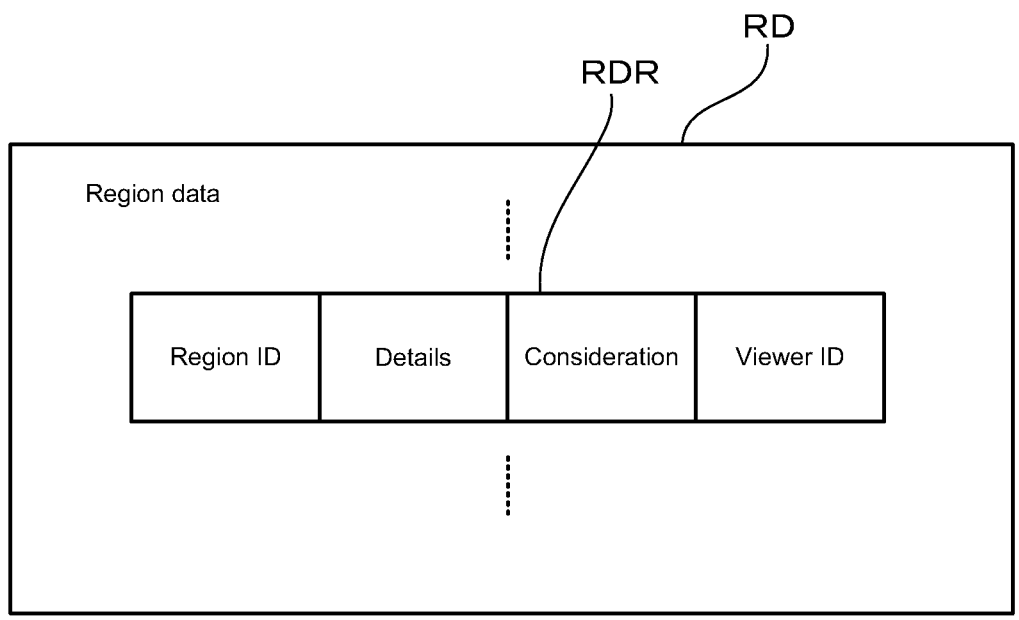
FIG. 9 is a diagram illustrating one example of region-data configuration.

Next, the details of the region data RD are described. FIG. 9 is a diagram illustrating one example of region-data RD configuration. The example of FIG. 9 illustrates region data RD in a situation wherein each individual option region 73 has a different consideration required for selection. Moreover, although the selection result at the selection opportunity may be managed by appropriate data separate from the region data RD, the example of FIG. 9 illustrates a situation wherein the selection result is managed by the region data RD. In this situation, as illustrated in FIG. 9, the region data RD include region records RDR for defining each individual option region 73. Moreover, to realize such a definition, the region record RDR includes, for example, information that is "Region ID", "Details", "Consideration", and "Viewer ID".

"Region ID" is information indicating a unique region ID for each individual option region 73 for identifying each individual option region 73. "Details" is information indicating details for defining (specifying) each individual option region 73. Described in "Details" is, for example, as detailed information (information defining each individual option region 73), information such as coordinates (for example, coordinates of a center position) and a range (including a form) in the selection screen 70. "Consideration" is information indicating an amount of a consideration (billing amount) necessary to select each individual option region 73. "Viewer ID" is information indicating a viewer ID unique to each viewer for identifying each viewer (user). Each individual option region 73 (region ID) is associated with viewer IDs indicating the viewers who selected each individual option region 73. Moreover, the viewer IDs (managed separately and uniquely through, for example, ID management data) may be acquired as appropriate. As one example, registration or input is requested when a predetermined application for displaying the viewing screen 60 is used. The information is recorded in the region record RDR so the information is mutually associated. Incidentally, the region data RD are not limited to the above information, and appropriate information may be managed according to, for example, a request for a form of each individual option region 73 to be managed. Alternatively, a portion of the above information may be omitted as appropriate.

Figure 10:
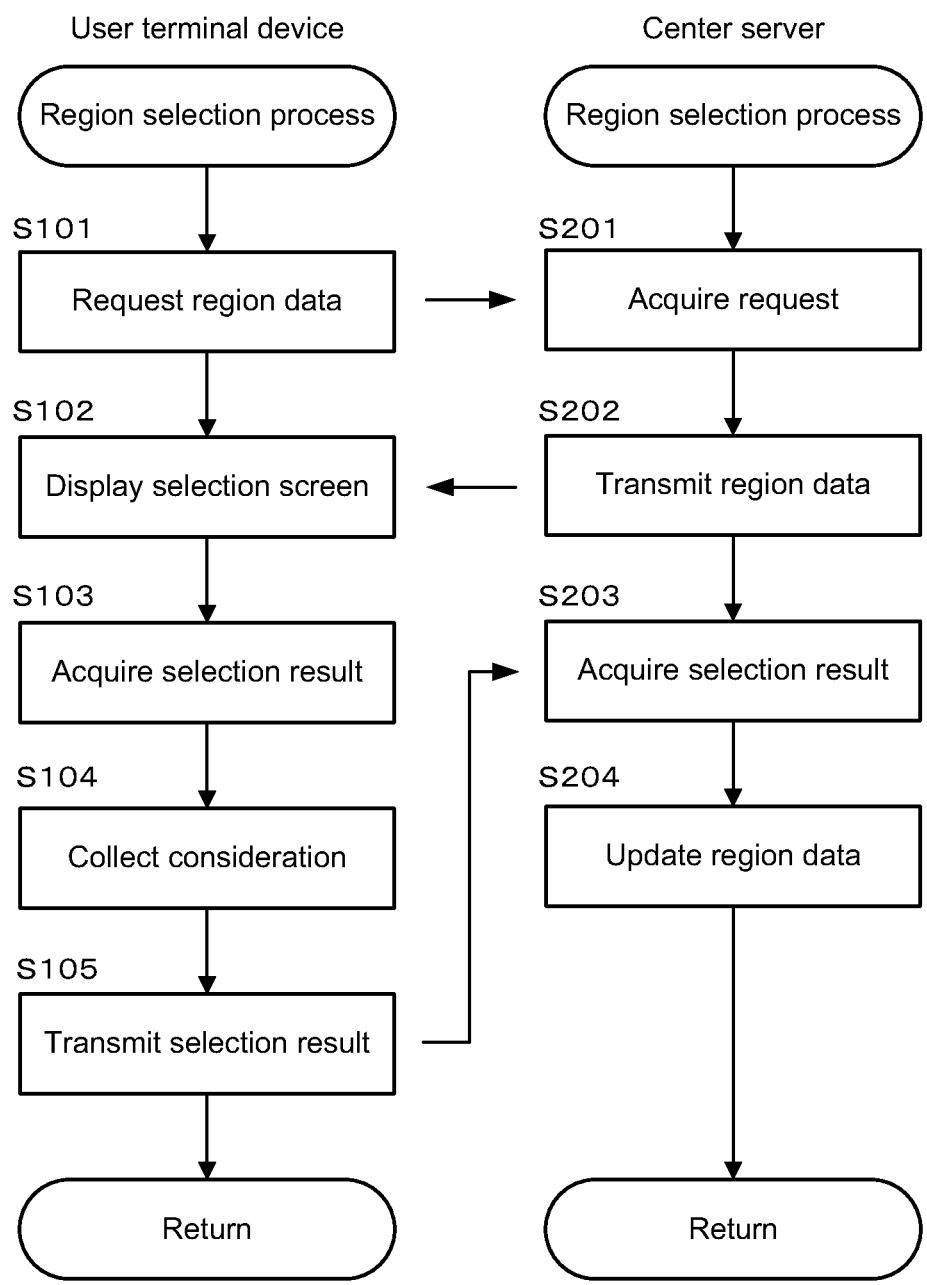
FIG. 10 is a flowchart illustrating one example of procedures in a region selection process.

Next, the region selection process, the privilege imparting process, and the probability changing process are described with reference to FIG. 10 to FIG. 12. The region selection process is a process for providing the selection opportunity. The example of FIG. 10 illustrates the region selection process in a situation wherein the selection opportunity is provided through the selection screen 70 in the example of FIG. 5. Incidentally, in the example of FIG. 10, processes mainly executed by the control unit 41 (video control unit 43) of the user terminal device 4 are illustrated as the user terminal device 4, and processes mainly executed by the control unit 21 (web services management unit 27) of the center server 2 are illustrated as the center server 2.

The user terminal device 4 starts the region selection process of FIG. 10 when display of the selection screen 70 is requested (for example, when the batting prediction icon 62 is touch-operated). First, the region data RD are requested from the center server 2 (step S101). When there is a request for the region data RD from the user terminal device 4, the center server 2 starts the region selection process of FIG. 10, acquires the request (step S201), and transmits the requested region data RD to the user terminal device 4 (step S202). Incidentally, the region data RD may be acquired from the center server 2 at an appropriate period in advance.

When the region data RD are acquired from the center server 2, the user terminal device 4 displays the selection screen 70 on the monitor 46 (step S102). That is, the user terminal device 4 provides the selection opportunity via the selection screen 70 (in other words, the center server 2 indirectly provides the selection opportunity via the user terminal device 4). When the range (form) of each individual option region 73 changes according to viewer characteristic information or the like, the user terminal device 4 (or the center server 2) provides the selection screen 70 so the range of each individual option region 73 changes according to such characteristic information or the like. As one example, as above, the selection screen 70 is provided so uniform individual option regions 73 are set.

Next, the user terminal device 4 acquires the selection result at the selection screen 70 (step S103) and collects the consideration corresponding to the selection result (step S104). In collecting the consideration (billing), a well-known process may be used as appropriate. After collecting the consideration, the user terminal device 4 transmits the selection result at the selection screen 70 to the center server 2 (step S105). However, when consideration collection was unable to be performed (billing failed) at step S104, the user terminal device 4 transmits to the center server 2 information indicating billing failure as the selection result (or instead of the selection result). Then, after the transmission, the user terminal device 4 ends the present region selection process.

Meanwhile, when the selection result is transmitted from the user terminal device 4, the center server 2 acquires the selection result (step S203). Next, the center server 2 updates the region data RD so as to reflect the selection result (step S204). Specifically, the center server 2 updates the "Viewer ID" information of the region data RD so the viewer is associated with the individual option region 73 selected by the viewer at the selection opportunity (selection screen 70). Then, after the update, the center server 2 ends the present region selection process. By this, the selection opportunity in the region selection service is realized through providing the selection screen 70. Incidentally, when information indicating billing failure is transmitted as the selection result from the user terminal device 4, the center server 2 may skip the process of step S204 and end the present region selection process.

The privilege imparting process is a process for imparting the privilege to the viewer based on the selection result at the selection opportunity. As above, when the selection result at the selection opportunity meets the position condition, it can be said that the viewer who selected the selection result is imparted with a right to acquire the privilege. However, in actual privilege-imparting, there is a situation wherein an additional condition such as the frequency condition is required. That is, there is a situation wherein the privilege condition includes an additional condition and providing of the additional condition is required in order to impart the privilege. The example of FIG. 11 illustrates the privilege imparting process in a situation wherein the privilege condition includes the position condition and the game condition as requirements. Moreover, as above, the same privilege may be imparted uniformly regardless of the individual option region 73 meeting the position condition. However, the example of FIG. 11 illustrates the privilege imparting process in a situation wherein different privileges are imparted according to the individual option region 73 meeting the position condition.

Figure 11:
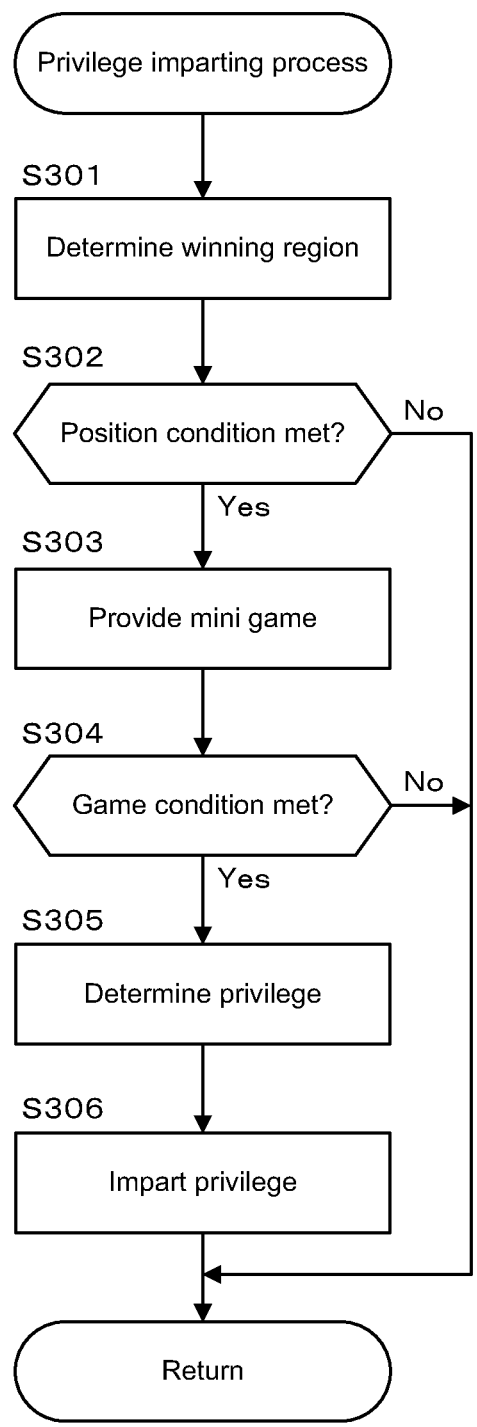
FIG. 11 is a flowchart illustrating one example of procedures in a privilege imparting process.

In the above situation, the web services management unit 27 starts the privilege imparting process of FIG. 11 each time batting (advancement event) occurs in the game of the game machines 3. First, based on the batting, a winning individual option region 73 (also referred to as "winning region 73" hereinbelow) is determined (step S301). The winning region 73 may be determined as appropriate based on the trajectory drawn by the batting. As one example, as above, among the batting trajectory, the arrival position is used to determine the winning region 73. As such, the web services management unit 27 determines the batting arrival position and determines the individual option region 73 including the arrival position (in one example, determined based on predetermined rules a predetermined amount of time prior to actual arrival; as such, strictly speaking, an anticipated arrival position) to be the winning region 73.

Next, the web services management unit 27 determines whether the position condition is met (step S302). The position condition is met when, as above, the individual option region 73 selected by the viewer at the selection opportunity (also referred to as "selected region 73" hereinbelow) and the winning region 73 match. As such, the web services management unit 27 determines whether the selected region 73 and the winning region 73 match (when there is a plurality of selected regions 73, whether the winning region is included therein). Then, when the selected region 73 and the winning region 73 do not match—that is, when the position condition is not met—the web services management unit 27 skips subsequent processes and ends the present privilege imparting process. In this situation, no privilege is imparted to the viewer.

Meanwhile, when the selected region 73 and the winning region 73 match—that is, when the position condition is met— the web services management unit 27 provides the mini game (step S303). Specifically, the web services management unit 27 provides, for example, the home-run catching game as the mini game through the catching screen 80. The web services management unit 27 may realize providing of such a mini game indirectly through the user terminal device 4. That is, the web services management unit 27 may realize the providing by instructing the user terminal device 4 to provide the mini game.

Next, the web services management unit 27 determines, based on play proceedings of the mini game, whether the game condition is met (for example, in a situation of the frequency condition, whether the predetermined frequency is exceeded) (step S304). For example, in the home-run catching game, the game condition is met when, as above, the batting falling position and the position of the catching character 82 match (a matching range may be set to an appropriate range wherein it can be deemed that the catching character 82 caught the batted ball). As such, in the home-run catching game, the web services management unit 27 determines whether the batting falling position and the position of the catching character 82 match. Then, when the batting falling position and the position of the catching character 82 do not match—that is, when the game condition is not met—the web services management unit 27 once again skips subsequent processes and ends the present privilege imparting process. In this situation as well, no privilege is imparted to the viewer.

Meanwhile, when the batting falling position and the position of the catching character 82 match—that is, when the game condition is met—the web services management unit 27 determines the privilege to be imparted to the viewer (step S305). The privilege may change as appropriate according to various conditions. As one example, as above, it changes according to the individual option region 73 corresponding to the winning region 73. Specifically, when, for example, privileges differ between the home-run region (home run) and the foul region (foul), the privilege changes according to an attribute of the winning region 73 of which among the home-run region and the foul region the winning region 73 belongs to. As such, in this situation, the web services management unit 27 determines which among the home-run region and the foul region the winning region 73 belongs to and determines the privilege that is according to the region that the winning region 73 belongs to (attribute of the winning region 73) as the privilege to impart to the viewer.

Next, the web services management unit 27 imparts the privilege determined at step S305 to the viewer (step S306). The privilege imparting may be realized as appropriate according to a content of the privilege to be imparted. For example, as the privilege, a signed ball, a spectating ticket (when viewing the game video is not free, a viewing ticket), various discount tickets, a ticket enabling an act of cheering, or another appropriate electronic or physical privilege (physical privileges require separately inputting delivery information) may be utilized as appropriate. As such, the privilege imparting may be realized as appropriate according to the characteristics of the privilege. For example, when an electronic privilege is to be imparted, the imparting is realized by updating data for managing privilege ownership. Then, after such imparting, the web services management unit 27 ends the present privilege imparting process. By this, the privilege is imparted according to the selection result at the selection opportunity. More specifically, the mini game is provided when the selection result meets the position condition, and the privilege is imparted according to the result of the mini game. That is, a privilege-imparting part of the region selection service is realized.

The probability changing process is a process for changing a probability of the position condition being met. The probability of the position condition being met may be changed as appropriate according to various change conditions. The example of FIG. 12 illustrates the probability changing process in a situation wherein the batting arrival position is changed within a predetermined range in conjunction with use of an item and the probability is thereby increased. Moreover, as one example, the change in the arrival position occurs in conjunction with use of a predetermined item as above. Such an item may be used at an appropriate timing. For example, the item may be used after the batting occurs (before reaching the arrival position). However, the example of FIG. 12 illustrates the probability changing process in a situation wherein the item is used in advance (prior to the batting occurring). In this situation, the web services management unit 27 starts the probability changing process of FIG. 12 each time batting occurs after the item is used and while item efficacy is remaining. First, the batting arrival position is determined (step S401). As in the determination of the winning region 73 in the privilege imparting process, the arrival position is determined based on predetermined rules a predetermined amount of time prior to actual arrival (alternatively, information on an anticipated arrival position that is similarly calculated from the game machine 3 may be acquired).

Next, the web services management unit 27 changes the arrival position determined at step S401 (step S402). Specifically, the web services management unit 27 changes the anticipated arrival position to approach the selected region 73 by an amount corresponding to a predetermined range (amount corresponding to a predetermined number of individual option regions 73). That is, as an effect of the item, the anticipated arrival position is shifted so as to approach the selected region 73. Moreover, when the selected region 73 is included in the predetermined range, the web services management unit 27 changes the arrival position to the selected region 73. As a result, the web services management unit 27 changes the probability of the position condition being met through such changing of the arrival position. Moreover, the changing may be realized directly by the web services management unit 27 by controlling the game screen 50 of the game machine 3. However, as one example, the changing is realized by the game machine 3 issuing an instruction to execute the change. That is, the web services management unit 27 realizes the change indirectly. Moreover, an appropriate effect for changing the arrival position, such as a wind effect, may be added to the change. After the change, the web services management unit 27 ends the present probability changing process.

Figure 12:
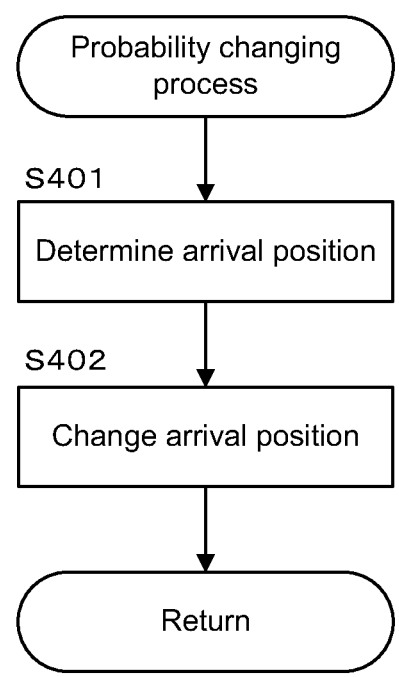
FIG. 12 is a flowchart illustrating one example of procedures in a probability changing process.

The procedure of FIG. 12 changes the batting arrival position within the predetermined range. As such, the position condition is met not only when the winning region 73 corresponds to the selected region 73 but also when the winning region 73 is included in the predetermined range. That is, an application range of the position condition is enlarged to the predetermined range based on the selected region 73. As a result, the probability of the position condition being met increases compared to a situation wherein the application range of the position condition is only the selected region 73.

As described above, according to the above embodiment, when a home run or a foul ball (batting) occurs according to predetermined rules so as to be associated with any one among the plurality of individual option regions 73 set in the outfield stands of the baseball game, a winning region 73 corresponding to the batting arrival position is determined. Moreover, when the winning region 73 matches the region 73 selected at the selection opportunity, the home-run catching game is provided, and when the ball is caught in the home-run catching game, a privilege is imparted to the viewer. As such, through the winning region 73, the privilege-imparting based thereon, and the like, selection at the selection opportunity can be gamified by having the batting arrival position be predicted. This can improve an interestingness of selection at the selection opportunity. Moreover, when the prediction is correct, the home-run catching game is provided, and a privilege is further imparted according to play proceedings therein. As such, benefits for the viewer can also be improved through such a home-run catching game or privilege. As such, selection at the selection opportunity can be promoted.

Furthermore, home runs generally have a lower possibility of occurring during the game than fouls (in terms of affecting playing results, the opposite is true). When the privilege value changes between a situation wherein the winning region 73 is the home-run region and a situation wherein the winning region 73 is the foul region—that is, when the privilege value changes according to an attribute of the winning region 73—such a possibility can be reflected in the privilege value. This can guarantee fairness to a certain extent compared to a situation wherein such a possibility difference is not reflected and uniform privileges are imparted.

Meanwhile, when selection of a plurality of individual option regions 73 at the selection opportunity is allowed according to a billing amount, the billing amount can be reflected in the probability of the position condition being met. As such, like a situation wherein the range of each individual option region 73 is changed according to the billing amount, a viewer with a greater billing amount (specific viewer) can be given preferential treatment.

Furthermore, when the privilege condition includes an additional condition other than the position condition, an interestingness of the gamified selection opportunity can be improved. For example, when, as above, the game condition is used as the additional condition, in conjunction with the position condition being provided, an appropriate mini game such as the home-run catching game is provided, and the privilege is imparted according to the game result in the mini game. As a result, an interestingness of playing such a mini game can be added to the gamified selection opportunity. This can improve the interestingness of the gamified selection opportunity.

Furthermore, the selection opportunity is provided as a portion of the region selection service via the user terminal device 4. As a result, a selection opportunity such as above can be provided to the viewer viewing the game video. This can improve an interestingness of viewing the game video and can therefore further promote viewing. Moreover, when an item that affects the batting arrival position is prepared for such a viewer, the viewer can participate in the game-play proceedings through use of such an item. As a result, a possibility arises of, for example, batting that would otherwise not be a home run becoming a home run. As such, the viewer can affect (interfere with) game results. In this situation as well, an interestingness of the gamified selection opportunity can be improved.

In the above embodiment, the web services management unit 27 of the center server 2, by executing the privilege imparting process of FIG. 11, functions as the region determination device, the privilege imparting device, the condition determination device, and the mini-game providing device of the present invention. Specifically, the web services management unit 27 functions as the region determination device by executing the process of step S301 in FIG. 11, functions as the privilege imparting device by executing the process of step S306 in FIG. 11, functions as the condition determination device by executing the process of step S304 in FIG. 11, and functions as the mini-game providing device by executing the process of step S303 in FIG. 11. Moreover, the web services management unit 27 of the center server 2 functions as the opportunity providing device of the present invention by indirectly providing the selection screen 70 via the user terminal device 4 through the process of step S202 in FIG. 10. Moreover, the web services management unit 27 of the center server 2 functions as the probability changing device of the present invention by executing the process of step S402 in FIG. 12.

The present invention is not limited to the above embodiment and may be embodied by being applied with an appropriate variation or change. For example, in the above embodiment, the selection opportunity is provided to the viewer of the game video via the user terminal device 4. However, the present invention is not limited to such an embodiment. For example, a selection opportunity such as above may be provided to the player P playing the game via the game machine 3.

Furthermore, in the above embodiment, the selection screen 70 in the example of FIG. 5 is illustrated. In other words, the options region 72 is set in the stadium image 71, wherein the stadium is shot from overhead as a plan view, through the selection screen 70 in the example of FIG. 5. However, the present invention is not limited to such an embodiment. The options region 72 (each individual option region 73) may be set as an appropriate region included in the stadium image 71 (may be an appropriate portion or an entirety of the game screen 50; for example, may include outside the stadium image 71—that is, outside the grounds). For example, as above, the options region 72 may be set above the grounds region 71A. In this situation, the selection screen 70 may be configured to select each individual option region 73 set above such a grounds region 71A.

FIG. 13 is an explanatory diagram for describing one example of the selection screen 70 for selecting each individual option region 73 set above the grounds region 71A—that is, a selection screen 70S of a variation. Specifically, the example of FIG. 13 schematically illustrates a selection screen 70S illustrating space above a range corresponding to a cross section at line XIII-XIII in the example of FIG. 5. As illustrated in FIG. 13, in the selection screen 70S of the variation, the options region 72 is set above the grounds region 71A and the spectator region 71B, and option regions 73 included therein are selected. Moreover, in the example of FIG. 13, for convenience in description, the ball image 65 and the home-run trajectory 66 are illustrated. In this situation, as one example, each individual option region 73 including the ball image 65 and the home-run trajectory 66 (individual option regions 73 illustrated by the rightwardly diagonal hatching in the example of FIG. 13) meets the privilege condition.

Incidentally, the selection screen 70S of the variation may be provided to correspond to space above an appropriate range. For example, the selection screen 70S of the variation may be provided so the options region 72 is set for each predetermined angle around a predetermined position such as home base. Moreover, the appropriate range is also not limited to each predetermined angle. For example, when space above the grounds region 71A and the spectator region 71B is divided into a grid shape by cube-shaped or rectangular-parallelepiped-shaped individual option regions 73, the options screen 70S may be provided so each individual option region 73 is selected in such various grid-shaped units. That is, the space above the grounds region 71A and the spectator region 71B (or one among the grounds region 71A and the spectator region 71B) may be divided by individual option regions 73 having various three-dimensional shapes, and the options screen 70S may be configured so such individual option regions 73 are selected in an appropriate range. Specifically, for example, the options screen 70S may be provided to correspond to a fixed range such as a range corresponding to line XIII-XIII in the example of FIG. 5, and a selection result thereat may be applied to the same height in the entire range—for example, all angles (may be a partial angle such as within the fairgrounds) around a predetermined position such as home base.

Likewise, an entirety or a portion of the roles (various processes and the like) of the center server 2 in the above embodiment may be executed as appropriate by the local system, the game machine 3, the user terminal device 4, or another system (or device). That is, the game system of the present invention may include, as appropriate, various other systems. Meanwhile, only the center server 2 may function as the game system of the present invention, or only the local system, the game machine 3, the user terminal device 4, or another appropriate system may function as the game system of the present invention.

Various aspects of the present invention respectively derived from the above embodiments and variations are described below. Incidentally, in the following description, to facilitate understanding of each aspect of the present invention, corresponding members illustrated in the included drawings are given in parentheses. However, the present invention is not limited to the illustrated forms.

A game system of the present invention is a game system (1) comprising a computer that provides to a user a selection opportunity for selecting at least one among a plurality of options (73) respectively corresponding to a plurality of regions (73) included in a game screen (50), displayed on a display device (36), of a game played through the game screen, wherein the computer serves as: a region determination device (27) that, when an event occurs according to a predetermined rule so as to be associated with a portion of the plurality of regions (individual option region 73 hatched using rightwardly diagonal lines in the example of FIG. 7) in the game, determines the portion of the regions associated with the event; and a privilege imparting device that imparts a privilege to the user when the portion of the regions is included in a corresponding region (dot-patterned individual option region 73 in the example of FIG. 5) serving as a region corresponding to the at least one option selected at the selection opportunity.

According to the present invention, when the event occurs according to the predetermined rule so as to be associated with the portion of the regions among the plurality of regions, the portion of the regions associated with the event is determined, and the privilege is imparted when the portion of the regions is included in the corresponding region. As such, through the determination of the portion of the regions and the privilege-imparting based thereon, selection at the selection opportunity can be gamified by having the portion of the regions associated with the event be predicted. This can improve an interestingness of selection at the selection opportunity. Moreover, when the portion of the regions is included in the corresponding region—in other words, when the prediction is correct—the privilege is imparted. As such, a benefit of the user (selector at the selection opportunity) can also be improved through the privilege. As such, selection at the selection opportunity can be promoted.

Incidentally, the term "included" in "when the portion of the regions is included in a corresponding region serving as a region corresponding to the at least one option selected at the selection opportunity" includes both a situation wherein the corresponding region includes a part of the portion of the regions and a situation wherein the corresponding region includes an entirety of the portion of the regions. Moreover, the situation wherein the corresponding region includes the entirety of the portion of the regions also includes not only a situation wherein the corresponding region is greater than the portion of the regions (for example, a situation wherein the portion of the regions is one region and the corresponding region is two or more regions including the one region) but also a situation wherein the portion of the regions and the corresponding region match (for example, a situation wherein both are one region and match).

As the game, various games may be provided as appropriate as long as the event occurs so as to be associated with the portion of the regions of the game screen. Various games such as an action game, a shooting game, a simulation game, a role-playing game, or a sports game may be provided as appropriate as the game in the game system. Moreover, according to the game, an appropriate event may occur so as to be associated with the portion of the regions. For example, when an action game is configured as a fighting game, a knockout in the fighting game and a location of the knockout or a specific move such as a special move and a location where the specific move occurred may respectively function as the event and the portion of the regions. Likewise, for example, when a sports game is configured as a ball game such as tennis, a ball that leaves the court and a location where the ball collides or a specific ball and a destination thereof—such as a serve and a location where the serve lands—may respectively function as the event and the portion of the regions. This is the same for other games as well. As such, for example, in one aspect of the game system of the present invention, the region determination device, when a baseball game that includes a pitcher (64) who pitches a ball (65) and a batter (63) who bats the ball pitched by the pitcher as batting is provided as the game through the game screen, may determine a region including a trajectory (66) drawn on the game screen by the batting as the portion of the regions so the batting that occurs in the baseball game functions as the event.

The plurality of regions may be set as appropriate in the game screen. For example, in a situation wherein the batting functions as the event in the baseball game, there are many cases wherein the game screen includes, for example, baseball grounds and stands for spectating baseball. The plurality of regions may be set as an appropriate range, such as both the grounds and the stands or one among the grounds and the stands. Moreover, when the game screen is displayed using effects that render a virtual, three-dimensional space, the plurality of regions may be set in an appropriate location of such a virtual, three-dimensional space. Likewise, an appropriate region including the trajectory of the batting may function as the portion of the regions. For example, among the trajectory of the batting, not only a batting arrival position but also an appropriate region where through the batting passes on the way to the arrival position may function as the portion of the regions. As such, for example, when a fly ball occurs as the batting, the plurality of regions may be set above (in a space of) the grounds, where the fly ball draws the trajectory.

Specifically, for example, in an aspect of the present invention wherein the baseball game is provided, the region determination device, when the game screen includes a grounds region (71A) wherein the batter and the pitcher play baseball and a spectator region (71B) set as stands for spectating the baseball, may determine the spectator region including the trajectory as the portion of the regions. Moreover, in the above aspect, the region determination device, when an arrival position serving as a position whereat the batting arrives is the spectator region, may determine a region, among the spectator region, including the arrival position as the portion of the regions.

Furthermore, as the privilege of when the portion of the regions is included in the corresponding region, various privileges may be used as appropriate. For example, such a privilege may be a physical object or an electronic object. Alternatively, such a privilege may be an intangible such as various rights. Moreover, such a privilege may be uniform regardless of the portion of the regions, the user, or play proceedings or change according to such. For example, a user having a high frequency of using the selection opportunity may be imparted a privilege of a higher value than a user whose frequency is low. Alternatively, a privilege of a value higher than normal may be imparted when the event occurs at a specific inning or specific proceedings (such as proceedings in the clutch or proceedings presenting a scoring chance). Moreover, the value of the privilege may change according to an attribute of the portion of the regions. Specifically, for example, in the aspect wherein the baseball game is provided, the privilege imparting device, when the spectator region includes a home-run region corresponding to a home run in the baseball and a foul region corresponding to a foul in the baseball, may impart the privilege to the user so a value changes between a situation wherein the portion of the regions corresponds to the home-run region and a situation wherein the portion of the regions corresponds to the foul region. Home runs have a lower possibility of occurring during the game than fouls (in terms of affecting playing results, the opposite is true). In this situation, such a possibility can be reflected in the value of the privilege. This can guarantee fairness to a certain extent.

Furthermore, the above privilege may be imparted unconditionally in the situation wherein the portion of the regions is included in the corresponding region or be imparted in conjunction with an additional condition being provided. When an additional condition is required, as such a condition, various conditions may be adopted as appropriate. For example, as such a condition, a condition that is met when a frequency of the portion of the regions being included in the corresponding region (including both a continuous frequency and a total frequency) exceeds a predetermined frequency, a condition that uses game-play proceedings, or the like may be used. Moreover, the privilege may be imparted only when the additional condition is met. Alternatively, if the portion of the regions is included in the corresponding region, the privilege may be imparted, and when the additional condition is met, a privilege of a higher value than the first privilege may be imparted. That is, a privilege condition including, as appropriate, the above conditions as a requirement may be used as a privilege-imparting condition, and the value of the privilege may be changed as appropriate—including a situation wherein no privilege is imparted—between a situation wherein the privilege condition is met and a situation wherein the privilege condition is not met.

Specifically, for example, as one aspect of the game system of the present invention, an aspect may be adopted wherein further comprised is: a condition determination device (27) that, when the portion of the regions is included in the corresponding region, determines whether the user meets a privilege condition; wherein the privilege imparting device changes the privilege between a situation wherein the privilege condition is met and a situation wherein the privilege condition is not met. Furthermore, in the above aspect, the condition determination device may determine that the privilege condition is met when a frequency that is counted each time the portion of the regions is included in the corresponding region exceeds a predetermined frequency and determine that the privilege condition is not met when the frequency is no greater than the predetermined frequency, and the privilege imparting device, by imparting the privilege only when the privilege condition is met, may change the privilege, in terms of a presence or absence of the privilege, so the privilege differs between a situation wherein the privilege condition is met and a situation wherein the privilege condition is not met. Alternatively, as an aspect wherein the privilege condition is used, an aspect may be adopted wherein further comprised is: a mini-game providing device (27) that provides a mini game to the user when the portion of the regions is included in the corresponding region; wherein the condition determination device determines whether the privilege condition is met according to a result of the mini game. In the above situations, an interestingness of a gamified selection opportunity can be improved.

A range of each region among the plurality of regions may be set as appropriate. For example, the range of each region may be uniform (fixed) regardless of the game-play proceedings, user characteristics, or the like or change (be variable) according to the play proceedings or the like. For example, a form—such as a shape or a size—of each region may change in a specific period or specific play proceedings (such as proceedings in the clutch or proceedings presenting a scoring chance), and the range may change as a result. Likewise, the range of each region may change according to user characteristics such as various attributes, such as sex or age, or various performance, such as game-play history or viewing history. Specifically, for example, as one aspect of the game system of the present invention, an aspect may be adopted wherein further comprised is: an opportunity providing device (27) that provides the selection opportunity to the user so a range of the region corresponding to each option changes according to characteristic information associated with a characteristic of the user. In this situation, the range of each region can be changed according to the user characteristics. Generally, the wider the range of the region, the higher a probability of the event occurring therein. As such, for example, a user having a high usage frequency of the selection opportunity can be given preferential treatment by making the range of each region wider than normal for the user. That is, a user can be given preferential treatment or less preferential treatment through changes in the range of each region. As a result, use of the selection opportunities can be promoted through such preferential treatment.

Furthermore, although the game event occurs according to the predetermined rule, a probability of the event occurring so the portion of the regions is included in the corresponding region may be fixed or variable. For example, the probability may change according to various change conditions such as the play proceedings, the user (or game-player) characteristics, user actions, or random conditions. For example, as a user action, use of a predetermined item may be adopted. That is, an item may be prepared that affects the probability of the event occurring so the portion of the regions is included in the corresponding region, and the change condition may be met when the item is used, thereby changing the probability. Moreover, the change may occur in the predetermined rule so the probability is affected or occur, after the region wherein the event is to occur is specified according to the predetermined rule, in the region. For example, as one aspect of the game system of the present invention, an aspect may be adopted wherein further comprised is: a probability changing device (27) that changes a probability of the event occurring so the portion of the regions is included in the corresponding region when the user meets a change condition. This can improve the interestingness of the gamified selection opportunity.

The selection opportunity may be provided to a user playing the game (player) or, for example, when the game-play proceedings are being distributed, be provided to a user viewing the distribution (viewer). Specifically, for example, in one aspect of the game system of the present invention, the selection opportunity, in a situation wherein game video recording the game screen is distributed to a user terminal device (4) connected via a network (NT), may be provided to a viewer viewing the game video via the user terminal device, and the viewer may function as the user. In this situation, a selection opportunity such as above can be provided to the viewer viewing the game video. This can improve an interestingness of viewing the game video and can therefore further promote viewing. Incidentally, in this situation, the game system does not need to provide the game.

Meanwhile, a non-transitory computer readable storage medium of the present invention is a non-transitory computer readable storage medium storing a computer program that is configured to cause a computer (21) connected to the display device to function as each device of the above game system.

Furthermore, a control method of the present invention is a control method of controlling a computer (21) which is incorporated in a game system (1) that provides to a user a selection opportunity for selecting at least one among a plurality of options (73) respectively corresponding to a plurality of regions (73) included in a game screen (50), displayed on a display device (36), of a game played through the game screen, wherein the control method of controlling the computer comprises: a region determination step that, when an event occurs according to a predetermined rule so as to be associated with a portion of the plurality of regions (individual option region 73 hatched using rightwardly diagonal lines in the example of FIG. 7) in the game, determines the portion of the regions associated with the event; and a privilege imparting step that imparts a privilege to the user when the portion of the regions is included in a corresponding region (dot-patterned individual option region 73 in the example of FIG. 5) serving as a region corresponding to the at least one option selected at the selection opportunity. The game system of the present invention can be realized by the computer program or the control method being executed.

The invention claimed is:

1. A game system comprising a computer that provides to a user a selection opportunity for selecting at least one option among a plurality of options respectively corresponding to a plurality of regions included in a game screen, displayed on a display device, of a game played through the game screen, wherein the computer serves as:
   a region determination device that, when an event occurs according to a predetermined rule so as to be associated with a portion of the plurality of regions in the game, determines the portion of the regions associated with the event; and
   a privilege imparting device that imparts a privilege to the user when the portion of the regions is included in a corresponding region serving as a region corresponding to the at least one option selected at the selection opportunity,
   wherein the region determination device, when a baseball game that includes a pitcher who pitches a ball and a batter who bats the ball pitched by the pitcher as batting is provided as the game through the game screen, determines a region including a trajectory drawn on the game screen by the batting as the portion of the regions so the batting that occurs in the baseball game functions as the event.

2. The game system of claim 1, wherein the region determination device, when the game screen includes a grounds region wherein the batter and the pitcher play the baseball game and a spectator region set as stands for spectating the baseball game, determines the spectator region including the trajectory as the portion of the regions.

3. The game system of claim 2, wherein the region determination device, when an arrival position serving as a position whereat the batting arrives is the spectator region, determines a region, among the spectator region, including the arrival position as the portion of the regions.

4. The game system of claim 2, wherein the privilege imparting device, when the spectator region includes a home-run region corresponding to a home run in the baseball game and a foul region corresponding to a foul in the baseball game, imparts the privilege to the user so a value changes between a situation wherein the portion of the regions corresponds to the home-run region and a situation wherein the portion of the regions corresponds to the foul region.

5. A game system comprising a computer that provides to a user a selection opportunity for selecting at least one option among a plurality of options respectively corresponding to a plurality of regions included in a game screen, displayed on a display device, of a game played through the game screen, wherein the computer serves as:
   a region determination device that, when an event occurs according to a predetermined rule so as to be associated with a portion of the plurality of regions in the game, determines the portion of the regions associated with the event;
   a privilege imparting device that imparts a privilege to the user when the portion of the regions is included in a corresponding region serving as a region corresponding to the at least one option selected at the selection opportunity; and
   a condition determination device that, when the portion of the regions is included in the corresponding region, determines whether the user meets a privilege condition,
   wherein
       the privilege imparting device changes the privilege between a situation wherein the privilege condition is met and a situation wherein the privilege condition is not met.

6. The game system of claim 5, wherein the condition determination device determines that the privilege condition is met when a frequency that is counted each time the portion of the regions is included in the corresponding region exceeds a predetermined frequency and determines that the privilege condition is not met when the frequency is no greater than the predetermined frequency, and
   the privilege imparting device, by imparting the privilege only when the privilege condition is met, changes the privilege, in terms of a presence or absence of the privilege, so the privilege differs between a situation wherein the privilege condition is met and a situation wherein the privilege condition is not met.

7. The game system of claim 5, further comprising: a mini-game providing device that provides a mini game to the user when the portion of the regions is included in the corresponding region; wherein
   the condition determination device determines whether the privilege condition is met according to a result of the mini game.

8. The game system of claim 1, further comprising: an opportunity providing device that provides the selection opportunity to the user so a range of the region corresponding to each option changes according to characteristic information associated with a characteristic of the user.

9. The game system of claim 1, further comprising: a probability changing device that changes a probability of the event occurring so the portion of the regions is included in the corresponding region when the user meets a change condition.

10. The game system of claim 1, wherein the selection opportunity, in a situation wherein game video recording the game screen is distributed to a user terminal device connected via a network, is provided to a viewer viewing the game video via the user terminal device, and
    the viewer functions as the user.

11. A non-transitory computer readable storage medium storing a computer program configured to cause a computer connected to the display device to function as each device of the game system of claim 1.

12. A control method of controlling a computer which is incorporated in a game system that provides to a user a selection opportunity for selecting at least one option among a plurality of options respectively corresponding to a plurality of regions included in a game screen, displayed on a display device, of a game played through the game screen, wherein the control method of controlling the computer comprises:
- a region determination step that, when an event occurs according to a predetermined rule so as to be associated with a portion of the plurality of regions in the game, determines the portion of the regions associated with the event; and
- a privilege imparting step that imparts a privilege to the user when the portion of the regions is included in a corresponding region serving as a region corresponding to the at least one option selected at the selection opportunity,
- wherein in the region determination step, when a baseball game that includes a pitcher who pitches a ball and a batter who bats the ball pitched by the pitcher as batting is provided as the game through the game screen, a region including a trajectory drawn on the game screen is determined by the batting as the portion of the regions so the batting that occurs in the baseball game functions as the event.

* * * * *